United States Patent
Mammen et al.

(10) Patent No.: US 10,891,940 B1
(45) Date of Patent: Jan. 12, 2021

(54) OPTIMIZATION OF SPEECH ANALYTICS SYSTEM RECOGNITION THRESHOLDS FOR TARGET WORD IDENTIFICATION IN A CONTACT CENTER

(71) Applicant: Noble Systems Corporation, Atlanta, GA (US)

(72) Inventors: Steven K. Mammen, Woodstock, GA (US); Patrick M. McDaniel, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 193 days.

(21) Appl. No.: 16/218,552

(22) Filed: Dec. 13, 2018

(51) Int. Cl.
 *G10L 15/08* (2006.01)
 *G10L 15/01* (2013.01)
 *G10L 15/06* (2013.01)

(52) U.S. Cl.
 CPC .............. *G10L 15/01* (2013.01); *G10L 15/08* (2013.01); *G10L 2015/0635* (2013.01); *G10L 2015/0638* (2013.01); *G10L 2015/088* (2013.01)

(58) Field of Classification Search
 USPC ........ 704/270, 231, 235, 240, 244, 255, 276
 See application file for complete search history.

(56) References Cited

U.S. PATENT DOCUMENTS

| | | |
|---|---|---|
| 5,956,678 A | 9/1999 | Hab-Umbach |
| 8,069,044 B1 | 11/2011 | Moorer |
| 8,374,869 B2 | 2/2013 | Kang et al. |
| 8,666,739 B2 | 3/2014 | Jeon et al. |
| 9,530,431 B2 | 12/2016 | Nakata et al. |
| 2011/0218802 A1 | 9/2011 | Bouganim et al. |
| 2012/0324353 A1* | 12/2012 | Torbey ................ G06F 3/04847 715/716 |
| 2014/0172428 A1 | 6/2014 | Han |
| 2014/0180694 A1 | 6/2014 | Fastow et al. |
| 2018/0054688 A1* | 2/2018 | Cartwright ............... H04S 7/30 |
| 2018/0182378 A1* | 6/2018 | Morris .................... G10L 15/26 |
| 2020/0103978 A1* | 4/2020 | Mixter .................... G06F 3/017 |

OTHER PUBLICATIONS

PCT Application WO201435394, Method and Systems for Predicting Speech Recongition Performance Using Accuracy Scores.

* cited by examiner

*Primary Examiner* — Qi Han

(57) ABSTRACT

An approach for optimizing a confidence score threshold that is used to recognize a target word(s) in an audio source. A variety of potential instances of the target word can be detected and classified using an initial confidence score threshold value. Each potential instance of the target word is audibly reviewed and validated by a user. After a determination of the correctness of each potential instance's classification, a different confidence score threshold value can be used to produce an updated set of classification results without requiring the user to revalidate the results. By using a variety of confidence score threshold values to produce various sets of classification results, an optimized confidence threshold setting can be determined for the identified target word based on minimizing errors in the various results. This value can then be applied for future analysis of the target word in an audio source.

20 Claims, 16 Drawing Sheets

OPTIMIZATION OF SPEECH ANALYTICS SYSTEM RECOGNITION THRESHOLDS FOR TARGET WORD IDENTIFICATION IN A CONTACT CENTER

BACKGROUND

Contact centers frequently employ speech analytic components or speech analytics systems for various purposes to improve the quality and efficiency of their operations. The term speech analytics system ("SAS") implies additional functionality compared to merely recognizing speech. A speech analytics system is able to derive a context of detected speech, and provides the ability to provide greater and more useful information to a contact center operator, as opposed to speech recognition systems. For example, while a speech recognition system may be able to detect when the word "yes" is spoken during a call, a speech analytics systems may be able to detect when the remote party answers "yes" to a specific question posed by the agent, providing more useful contextual information. Further, in a contact center application of speech analytics, the context of the calls is typically limited or focused in some manner, allowing greater utility of the technology to provide insights. This illustrates a distinction between broadly detecting a speech pattern and determining the context of when a speech pattern occurs during a call in a contact center.

A speech analytics system can be used to monitor and ensure that the agent provides certain information to remote parties during a call, and at specific times during the progression of the call. The provision of this information may be required by various regulations or policies. For example, an agent may be required to confirm a caller's name and address at the beginning of a call because of the particular context of the call. A speech analytics system can be used to verify that the agent has done so in accordance with corporate policies or regulations. In other applications, a SAS can be used to identify various keywords during a call in order to assist the agent with a particular topic. Thus, related information may be presented to an agent on a screen of their computer if the remote party wishes, e.g., to return an item previously purchased. Upon detecting that a product return is to occur, the SAS could cause the appropriate product return information procedures and user interfaces to be presented to the user, thus saving the agent from having to manually invoke these functions. In other applications, SAS are used to grade the performance of an agent. By verifying certain information was provided, by gauging the satisfaction of the remote party, and by evaluating the terms/phrases used by the agent, automatic evaluation of the agent's performance can be performed.

A variety of benefits can be obtained by a contact center using a SAS to analyze calls handled in the contact center. However, the effectiveness of using a SAS ultimately depends on the accuracy of the SAS to recognize certain targeted words/phrases during the call. Because the call in the contact center has a context of some type (e.g., the call pertains to customer service for purchasers of laptop computer, appointment setting for automotive repairs, or providing assistance to healthcare patients) the SAS can use this contextual information in performing its analysis. For example, in the context of scheduling automotive repair appointments, the caller can be expected to indicate a make or model of their automobile and potentially a needed action. The caller may state, e.g., "my Ford needs an oil change." However, in the context of assisting laptop users, the phrase "Ford" or "oil change" may not be expected, nor searched for, and recognizing these phrases by the SAS may not be as critical to improving the operational efficiency of the contact center. Thus, it is critical for various applications to recognize certain words for a given context.

Obviously, failing to recognize certain words means that the resulting action expected to occur will not happen. A call center scheduling automotive repairs may rely on an SAS to detect the phrase "oil change" in order to present to the agent all of the available times for scheduling this service action—i.e., changing the oil. Without properly detecting the phrase, the agent may be required to manually retrieve the schedule, taking additional time to interact with their repair management system. On the other hand, in the context of patient healthcare application, the phrase "oil-change" is not expected, and likely to be irrelevant, in aiding the agent handle the call. In that case, other phrases may be particularly pertinent.

In some applications, the processing of the audio to detect when a phrase is spoken may not occur in real-time. But, even so, accuracy in detecting the relevant phrases is needed. To increase the accuracy in detecting certain phrases, an audio recording may be processed by a SAS using different parameter values in order to achieve a certain degree of accuracy. For example, the goal of a desired phrase in an audio recording could be accomplished by processing the audio multiple times in a serial manner using different parameters in order to recognize the desired phrase. In other embodiments, e.g., for real-time processing of a call, processing the audio serially is not feasible. However, the audio could be processed simultaneously, in parallel, by two or more SAS processes using different parameters in order to increase detection of the desired phrases, or to obtain a desired level of confidence in detecting the desired phrases. To extend this concept, several different parameters values could be used to evaluate the same audio to increase detection of a desired phrase. Improving the accuracy of the SAS is important to the utility and efficiency of the SAS.

In many situations, to verify whether the SAS is properly detecting the desired phrases, a manual review of the audio recording and the portions identified by the SAS as detecting the phrases may be required to verify that the SAS parameters are, in fact, optimized. This manual review, however, consumes human capital resources. Thus, if three various processes (using e.g., three different combinations of parameters to analyze the audio) are used to detect a desired word or phrase in the same audio, then manually verifying how well each of these processes function consumes three times as much time to review. Thus, it is important for the SAS to accurately recognize the targeted words/phrases with an optimal set of processing parameters.

Thus, it may be necessary to "fine tune" the operation of a SAS for particular word or phrase in order to detect with minimal error or maximum accuracy. Measuring minimal error or maximum accuracy when detecting a targeted word using an SAS are not necessarily singular nor simple, because there are different types of errors and accuracy measurements that may occur. For example, consider an SAS that is deployed in a contact center servicing calls that are directed to a veterinarian call center. Suppose the SAS is configured to detect the target word "cat" so that upon detecting that the caller is inquiring about feline related services (versus canine related services), a screen regarding feline care or feline admission records is presented to the agent. Conversely, if the caller utters the word "dog", information regarding canine care or canine admission records may be presented. Thus, it becomes particular relevant in this context for the SAS to be configured to accurately recognize the word "cat" when spoken by the remote party. The SAS must be able to distinguish that target word from other similar sounding words. For example, the word "can't" could be mistaken for the word "cat" as the words sound similar. Or, the remote party may have an accent impacting the systems accuracy in detecting the target word.

An SAS configured to detect the target word "cat" may have different types of outcomes when processing a phrase. First, the word "cat" could have been actually spoken by the caller and properly detected by the SAS. In this case, the operation of detecting and reporting the target word/phrase is correct. Second, the word "cat" may be spoken, but the word may not have been detected by the SAS. When the word "cat" is spoken, but not detected, this situation is referred to as a "false negative." The SAS has processed the audio and concluded that the audio does not match the targeted word—thus, it is a negative outcome. However, because it was an incorrect determination, it is referred to herein as a "false" negative outcome (or simply "false negative"). A third option is that the word was not spoken, but some other phrase in the audio was incorrectly reported as the targeted word (e.g., "can't" is detected as "cat"). In this case, the outcome is called a "false positive." Finally, if a phrase was detected, and correctly determined to not be the word (e.g., "can't" was detected and not reported), then the words was properly not reported as an instance of the target word.

It would be desirable to have a way to "fine tune" the SAS so as to avoid either a false positive or a false negative, and only report a correct determination (and similarly, correctly exclude words which are not the target word). When the SAS is more accurate, i.e., minimizing false positives or false negatives, it is generally considered an improvement. Thus, generally it is desirable to reduce false negatives and false positive errors. However, as will be seen, parameters can be set to minimize making one type of error (e.g., a false positive) at the expense of favoring making the other type of error (e.g., false negative). Complicating the analysis is that the SAS may be configured to detect multiple instances of a targeted word, and fine tuning parameters to correctly detect one instance of a target word in an audio stream may result in failing to correctly detecting a subsequent instance of the same target word and another portion of the audio stream. Finally, setting a certain parameters at a certain level may increase the accuracy for one type of target word, but may not be optimal for a different target word.

Because of the large number of data points that may be involved, and the various classifications possible for each instance, presenting the information to the user in a quick, easy to comprehend manner is difficult. Furthermore, these classifications change based on the particular threshold value used. In order to display these to a user in an easy to comprehend manner, innovative and efficient methods of display are required, as well as data structures retaining the pertinent information.

It can be extremely difficult to attempt to adjust certain parameters so as to optimize proper recognition of target words. Doing so via human verification of the SAS operation is extremely time consuming. Further, the computer processing itself can be time consuming. For example, if there are various detection related parameters that can be set in combination, the number of possible combinations can quickly reach a large number. Requiring the audio to be reprocessed for each combination of parameters can be processing intensive and time consuming. Thus, system and methods to automate and facilitate the optimization of a SAS system are needed.

SUMMARY

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

In one embodiment an optimized confidence score threshold level value may be determined by processing audio to detect a plurality of instances of a target word using an initial threshold confidence score value. These instances are then manually verified by a user, and classified as being correctly reported, correctly excluded, incorrectly reported (false positive), and incorrectly excluded (false negative). Then, the process may automatically reprocess the same instances using one or more different confidence score threshold level values, and report the outcome of each instance for each threshold level value. Since the target word instances have been manually verified by the user, these subsequent outcomes can be determined as correct or not without repeating the manual validation by the user. The confidence score threshold level value having the fewest errors (or the greatest number of correct outcomes), however that is defined, may be then selected as the optimal threshold confidence level value.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Exemplary Contact Center Architecture

Figure 1:
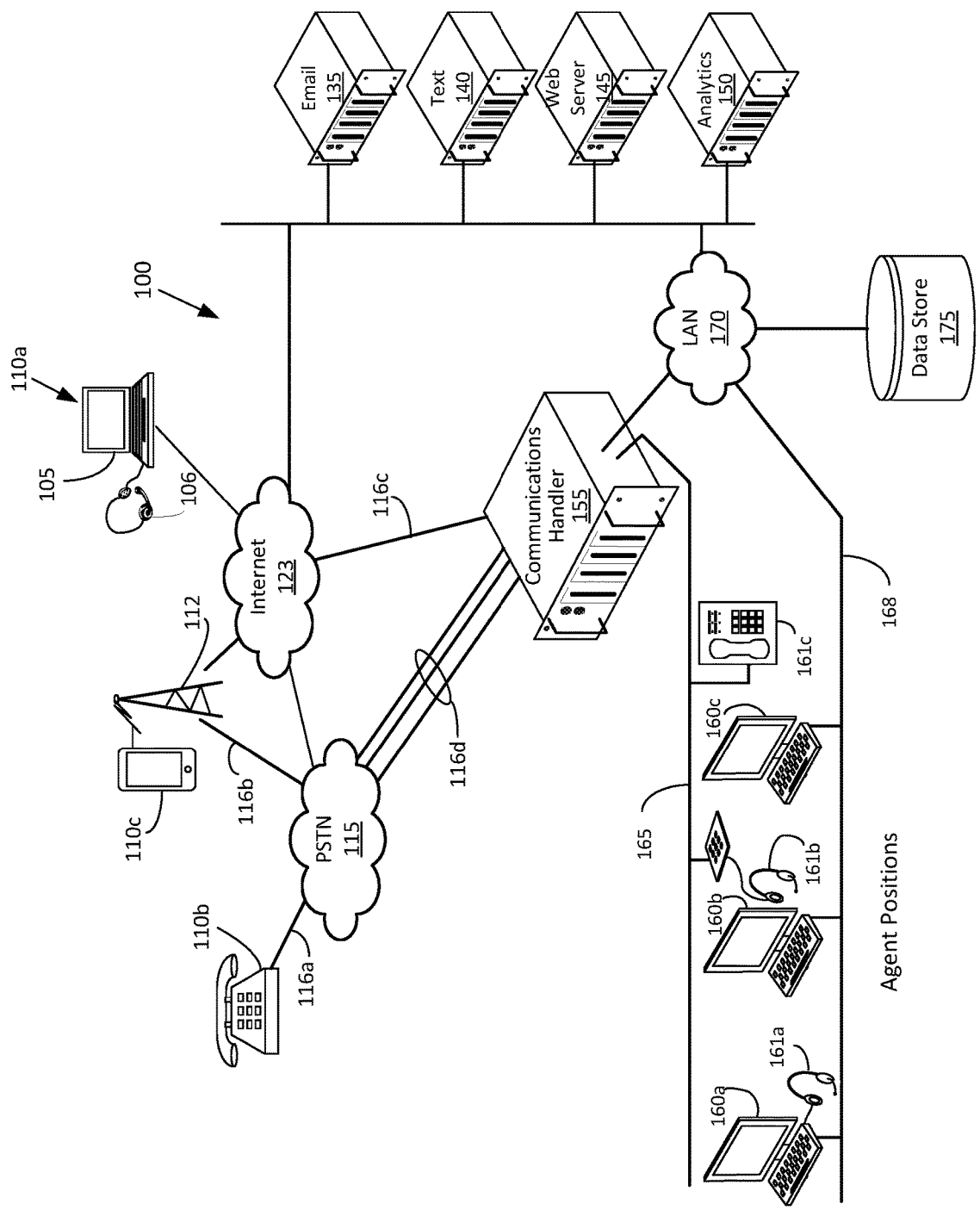
FIG. 1 illustrates one context of a contact center in which an embodiment of the technologies and concepts disclosed herein may operate.

FIG. 1 illustrates a contact center architecture 100 that may be used in accordance with the various technologies and concepts disclosed herein. The contact center architecture 100 shown in FIG. 1 may process voice communications and non-voice communications that are inbound-only, outbound-only, or a combination of both (sometimes referred to as a "blended" contact center). Although many aspects of contact center operation may be disclosed in the context of voice calls, the contact center may process other forms of communication such as, for example, facsimiles, emails, text messages, video calls, and chat messages.

Since the contact center may handle communications originating from a party, or initiated to a party, the term "party," "user," or "customer" without any further qualification, refers to a remote person associated with a communication processed by the contact center, where the communication is either received from, or placed to, the party. Thus, use of these terms is not intended to limit the concepts described in this application.

Accordingly, inbound voice calls can originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 110c, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123 using Internet-based protocols, such as SIP or H.323 protocols. For convenience, unless indicated otherwise, the term "trunk" refers to any type of facility 116c, 116d providing voice calls to, or from, the contact center, regardless of the type of protocol or technology used. Specifically, a "trunk" is not limited to time-division multiplexing ("TDM") technology, but could refer to various VoIP communication channels.

Inbound voice calls may also originate from a calling party employing a so-called "IP phone," "VoIP phone," or "soft phone" 110a. In particular embodiments, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP") and the call may be conveyed by an Internet provider 123. Those skilled in the art will recognize that a variety of Internet Protocols ("IP") and communication facilities may be used to convey voice calls.

The term "voice call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a voice call in an attempt to establish two-way communication, and a call can be said to exist even prior to establishment of the two-way connection.

In various embodiments, inbound voice calls from calling parties to the contact center may be received at a communications handler 155, which could be, for instance, an automatic call distributor ("ACD"). In particular embodiments, the communications handler 155 may be a specialized switch for receiving and routing inbound calls under various conditions. Further, the communications handler 155 may be embodied as a dedicated form of equipment readily available from various manufacturers, or the communications handler 155 may be a so-called "soft switch" comprising a suitable programming module executed by a computer processing device to perform the necessary specialized functions. The communications handler 155 may route an incoming call over contact center facilities 165 to a phone device used by an available agent for servicing. Depending on the embodiment, the facilities 165 may be any suitable technology for conveying the call, including but not limited to a local area network ("LAN"), wide area network ("WAN"), ISDN, or conventional time division multiplexed ("TDM") circuits. In addition, the facilities 165 may be the same or different from the facilities used to transport the call to the communications handler 155.

The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. For instance, the voice device 161a-161c may be a soft phone device exemplified by a headset 161a connected to the computer 160a. Here, the soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

The combination of computing device 160a-160c and voice device 161a-161c may be referred to as a "workstation." Thus, for these particular embodiments, the workstation collectively has a data capability and a voice capability, although separate devices may be used. Here, data may be provided to an agent's workstation computer 160a-160c over facilities 168 along with routing the call to the agent's workstation voice device 161a-161c over other facilities 165. In some instances, "workstation" may be used in reference to either the data or voice capability at the agent's position. For example, "routing the call to the agent's workstation" means routing a call to the voice device 161a-161c at the agent's position. Similarly, "routing the call to the agent" means routing a call to the appropriate equipment at an agent's position. The workstation typically has a display provided via a computer monitor. This is used to convey information to the agent about the calls, and the agent may interact with the communications handler 155 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents' positions are in their respective individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 155 to allow the contact center (including the communications handler 155) to know which agents are available for handling calls. In particular embodiments, the communications handler 155 may also maintain data on an agent's skill level that may be used to route a specific call to the agent or group of agents having the same skill level. The communications handler 155 may also know what types of channels and combinations of channels the agent can handle.

Accordingly, in various embodiments, the communications handler 155 may place a call in a queue if there are no suitable agents available to handle the call, and/or the handler 155 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 175 to retrieve or provide information for processing the call. In other configurations, the IVR may be used to only provide announcements.

As noted, the contact center may also receive non-voice communications such as, for example, texts (short messaging service ("SMS") and/or multimedia messaging service ("MMS")), emails, and chats. For instance, text messages may be sent by parties using smart phones 110c over a MSP 112 and the Internet 123 and are received by a text gateway server 140. Once received, the text gateway server 140 in particular embodiments may inform the communications handler 155 of the text messages and the handler 155 may then queue up the text messages for appropriate agents.

In other embodiments, the contact center may make use of one or more components separate from the handler 155, such as a communications router (not shown in FIG. 1) that instead handles the routing of various communications to agents. For instance, in certain particular embodiments, the text gateway server 140 may instead inform a communications router of the text messages and the router may then queue up the text messages for appropriate agents. Similarly, the communications handler 155 may also inform the communications router of various calls so that the router can then queue up the calls for appropriate agents. However, with that said, the remainder of the specification makes reference to a communications handler 155 to carry out such functionality, although it should be understood that portions of the communication handler's 155 functionality may be performed by one or more other components within the contact center architecture 100.

Similarly, emails may be sent by users over the Internet 123 to an email server 135, and the email server 135 may inform the communications handler 155 of the emails so that the communications handler 155 can queue up the emails for appropriate agents. With respect to chats, in various embodiments a party can request a chat by accessing a website via a Web server 145. In turn, the Web server 145 informs the communications handler 155 of the chat and the handler 250 queues the appropriate agent to handle the chat.

Depending on the embodiment, the interactions between the various components shown may involve using a local area network ("LAN") 170. However, other configurations are possible, such as, but not limited to, using a wide area network, wireless network, router, bridge, direct point-to-point links, etc. Furthermore, in lieu of using facilities 165 directly linked to the communications handler 155 for conveying audio to the agents, other facilities 168 associated with the LAN 170 may be used.

In addition to receiving inbound communications, the contact center may also originate communications to parties, referred to herein as "outbound" communications. For instance, in particular embodiments, the communications handler 155 may be a dialer, such as a predictive dialer, that originates outbound calls at a rate designed to meet various criteria. Here, the communications handler 155 may include functionality for originating calls, and if so, this functionality may be embodied as a private automatic branch exchange ("PBX" or "PABX"). In addition, the communications handler 155 may directly interface with voice trunks using facilities 116c, 116d to the PSTN 115 and/or Internet provider 123 for originating calls. After the calls are originated, the communications handler 155 may perform a transfer operation to connect the calls with agents, a queue, or an IVR. Furthermore, in various embodiments, the communications handler 155 may make use of one or more algorithms to determine how and when to dial a list of numbers so as to minimize the likelihood of a called party being placed in a queue while maintaining target agent utilization. In similar fashion, the email server 135, text gateway server 140, and the Web server 145 can be utilized in various embodiments to originate outbound emails, text messages, and chats with parties.

In various embodiments, the communications handler 155 determines which agent is authorized and available to handle a communication upon being made aware of a voice or non-voice communication, and thereafter appropriately coordinates any response to the communication. In addition, the communications handler 155 may also make use of one or more schemes in allocating communications to agents such as, for example, on a round-robin basis, a least-number-served basis, a first available agent basis, and/or a seniority basis.

Furthermore, in various embodiments, the communications handler 155 is configured to establish a connection to some type of analytics component 150 upon being made aware of a voice or non-voice communication. Thus, in particular embodiments, the contact center architecture 100 may include one or more dedicated channels (e.g., call legs) between the communications handler 155 and the one or more analytics components or systems 150 suitable for conveying the communication (e.g., audio from a call) between the communications handler 155 and the analytics component(s) 150.

In turn, the analytics component 150 analyzes the communication once a connection is established and provides an indication (e.g., event notification) when a particular word or phrase is detected in the communication. This word or phrase is referred to as a "keyword," although use of the term "keyword" should not be construed as limiting recognition to a single word.

For instance, the communication may be a phone call and the analytics component 150 may be a speech analytics component that analyzes the audio of the phone call to detect keywords that are spoken on the call by either the remote party or the agent. Here, a number of different analytics approaches may be employed by the speech analytics component depending on the embodiment. For example, the speech analytics component may make use of one or more of a phonetics approach, large-vocabulary continuous speech recognition (LVCSR) approach, and/or direct phrase recognition approach in performing voice analytics on the phone call.

While in another instance, the communication may be an exchange of text messages or Web chat messages and the analytics component 150 may be a text recognition component that analyzes the text of the text or Web chat messages to detect keywords that are typed by either the remote party or the agent. Here, for example, the text recognition component may make use of full-text search techniques or optical character recognition (OCR) to identify keywords in the text or Web chat messages. The communications handler 155 may receive event notifications from the analytics component 150 when keywords are identified, and the communication handler 155 may then forward these notifications to the appropriate workstation of the agent handling the communication.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 155 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 1 represents one possible configuration of a contact center architecture 100, and that variations are possible with respect to the protocols, facilities, components, technologies, and equipment used.

General Overview

Contact centers frequently have a need to recognize certain key words, referred to as target words occurring in the audio of a call. The target word(s) may actually be a phrase, and not limited to a single word. For simplicity, the concepts are frequently illustrated herein as a single word. Certain phrases may be harder to detect, or the SAS may frequently incorrectly report the detection of the target word. The detection of a target word may involve determining a confidence score associated with audio of the potential target word (called an instance), which reflects a likelihood of the instance of the target word actually being the target word. A confidence score threshold value is used to determine whether a potential target word should be reported as an actual instance of the target word or not. The value of the confidence score threshold determine whether the confidence score of an instance passes the test and is hence reported. Setting an optimal value of the confidence score threshold value may be a difficult and time consuming process. The concept and technologies disclosed herein allow a default threshold score to be used to evaluate the various confidence scores of the instances and manually validate the determination. Then, an automated process can reevaluate each instance's confidence score using a new confidence score threshold value, and compare the output with the manually validated results. Then, based on the criteria that defines an optimized confidence threshold value, the optimized confidence threshold value can be stored as the default value going forward for detecting instances of that target word.

Confidence Levels

Speech analytics systems frequently function by identifying various phoneme sounds and matching the sounds against a library of phonemes. Even within a single syllable word, there may be a number of different phonemes encountered. There are various techniques for matching a speech sounds to a phoneme or set of phonemes, and ultimately to word. These techniques may involve analyzing relative energy levels of the phoneme as a function of time, the various sound frequencies present, or other techniques. These phonemes are then matched, and ultimately a determination is made of the corresponding word for the processed sound. While various components or distinct algorithms may be used to evaluate the sound(s). Continuing with the prior example of detecting the word "cat", the confidence level can be used to determine whether to report the sound as an instance of the speaker saying the word "cat" or exclude the sound (i.e., not report) because the audio is some other word (e.g., "can't").

The SAS may be configured to match a portion of the speaker's audio (utterance), which may be a portion of a syllable, the whole syllable, a word, or even a words, with known templates of phonemes to determine whether the utterance matches the known phoneme. The exact method of how this comparison is performed may vary and are known to those skilled in the art of speech phoneme recognition processing. How the matching is performed is outside the scope of the concepts and technologies disclosed, as long as the algorithm used computes a numerical value representing a "confidence score." The confidence score is a numerical value reflecting the likelihood that the sound corresponds to a recognized phoneme. This may involve a comparison of a sequence of phonemes of a word with further templates or other information to ascertain whether the utterance matches to a specific word/phrase. Ultimately, the overall results is reflected by a numerical value representing the level of certainty that the utterance matches the target word or phrase and is referred to herein as the "confidence score." Thus, the term "confidence score" refers to a relative confidence indicator that a sound or utterance is a spoken instance of a particular target word.

As used herein, "target word" means a word or set of words (e.g., a phrase) that is intended to be recognized by a SAS. The target word is typically configured by an administrator and will be a subset of the vocabulary understood by the SAS. Thus, a SAS may be configured to recognize a vocabulary of words, but may be configured to focus on recognizing certain words, such as recognizing "cat" and distinguishing such instances from e.g., "can't". The target words are those words which are of particular interest to the contact center to be detected by the SAS during a given call. It is further possible to define different confidence score thresholds for these different target words. In other embodiments, the target words may be part of the general vocabulary recognized by the SAS and the SAS may rely on a default confidence level.

Typically, a threshold value is set and indicated to the SAS. This confidence score threshold value, or simply threshold value, is used to evaluate the confidence score of a potential instance of the target word to determine whether the sound corresponds to the target word. Confidence scores meeting or exceeding the threshold value are presumed to be correct instances, and are said to be "a match". Thus, when the sounds for "cat" are detected by the SAS, a confidence score is produced, and evaluated against the confidence score threshold value for purposes of determining whether the sound is to be reported as detecting an instance of the target word "cat" or not.

For purposes of illustration and not limitation, it is assumed that the confidence score is a value from 1 to 100, and the confidence score threshold is set to 75. Those skilled in the art will recognize that other ranges could be easily used, and the range of 1 to a 100 allows easy illustration of various aspects and concepts of the invention. Further, for purposes of illustration, the confidence score or threshold may be alternatively expressed as a percentage. Thus, setting the confidence score threshold value to 75% reflects a somewhat high level of confidence required for a confidence score in order to report that the audio matches the target word. A 90% confidence score reflects that there is a very high likelihood of a match, whereas a 10% confidence score reflects a very low confidence of a match. Using a percentage allows different numerical scoring systems to be utilized.

Figure 2:
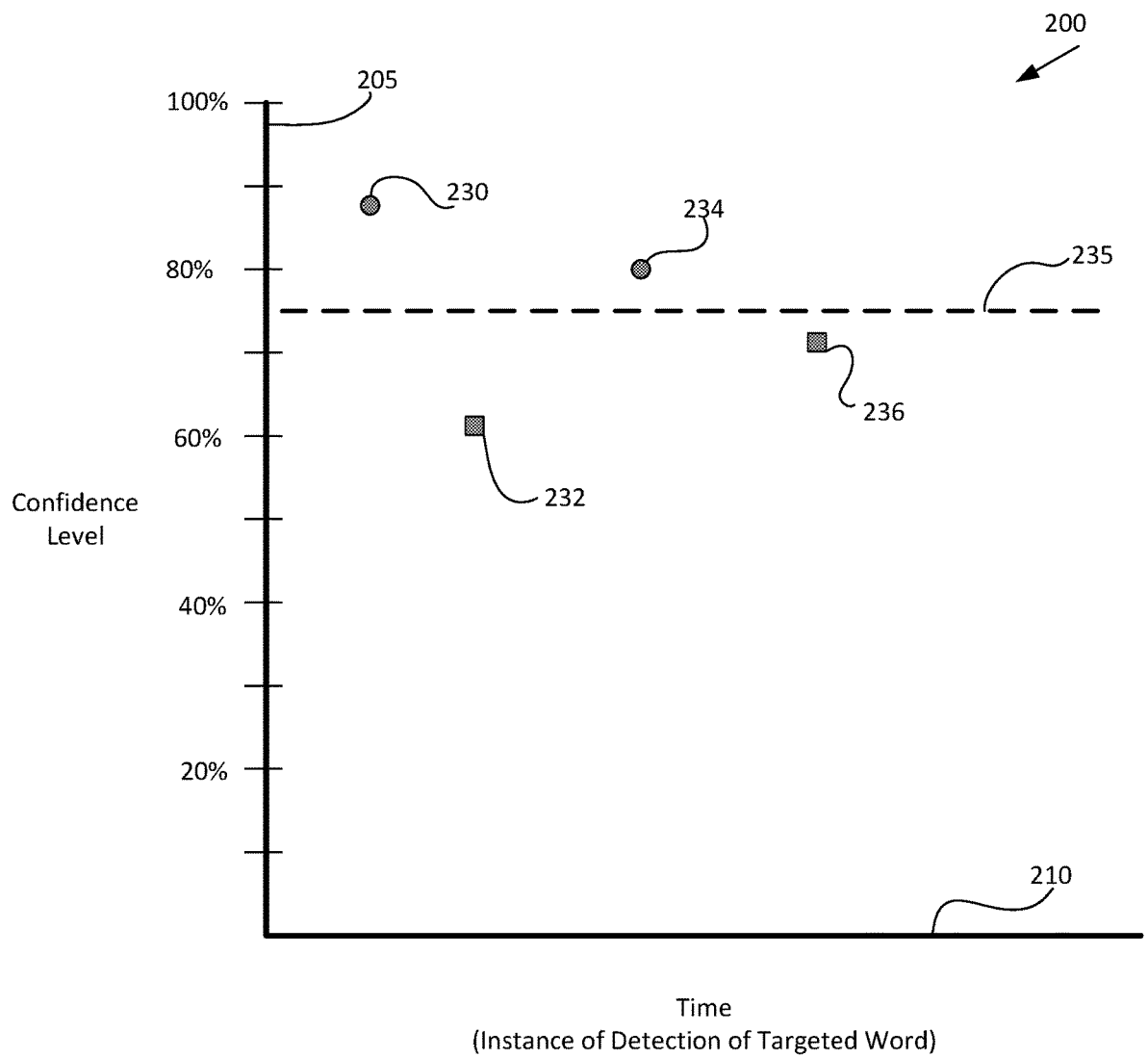
FIGS. 2, 3, 4A, 4B, 4C, 4D, 5, 6, 7, 8A, and 8B illustrate various embodiments of scattergrams, or portions thereof, illustrating instances of a target word identified in audio.

Turning to FIG. 2, these concepts are further illustrated in a "word instance scattergram" or simply "scattergram." The scattergram depicts various instances of when a target word is (potentially) detected by a SAS during audio of a given call. Turning to FIG. 2, the scattergram 200 depicts an X axis 210 representing time of an audio sample or source. The absolute time units are not necessary to be shown, since the main purpose is to illustrate a relative order of when instances are detected. The Y axis 205 represents a confidence level or confidence score and is shown in terms of a percentage. The dotted line 235 represents a confidence score threshold level (sometimes simply referred as the "confidence threshold," "threshold," or "threshold value"), which in this example is set at approximately 75%. The particular value used may vary, but this is sufficient to illustrate the concepts and technologies disclosed herein.

Four word instances 230, 232, 234, and 236 are shown in FIG. 2. These represent locations in the audio where a target word was potentially or tentatively detected. For purposes herein, reference to a "reported" target word instance refers to an occurrence of an utterance where the confidence score for a word is over the confidence threshold. An "unreported word instance" is an occurrence of an utterance where the confidence score for the word is under the threshold. It is said to be excluded (i.e., excluded from being reported). If the confidence score is at the threshold, it could be reported or not. For purposes herein, it will be assumed that meeting or exceeding the threshold causes the instance to be reported. A "potential instance" is when an utterance could be reported or not (i.e., its confidence score has not yet been determined or not yet compared to the threshold).

In some embodiments, every utterance may be processed and evaluated so as to determine if the utterance is one of the any defined target words. In some embodiments, the process may readily determine that the utterance is not a potential instance of the target word. In other words, the utterance is so different from the target word, it is highly unlikely that it is a match. For purposes of illustration, reference to a "potential instance" or "instance" refers to a when it is feasible that the utterance could be the target word. For example, assuming one of the target words to be detected is "cat," the SAS may analyze every utterance in an audio source to determine if it could be the word "cat." Thus, in the phrase, "how are you today", the SAS may analyze whether the words "how", "are" "you", and "today" are utterances matching with the word "cat." For practical purposes and for illustration, if the likelihood of an utterance matching a target word is very low, then these examples, are not considered as "potential instances," though in other paradigms they could be considered as such. The SAS may process each utterance for other reasons to determine if it matches other words (e.g., the utterances of "today" may be processed to determine if it matches the words "today"). But, for purposes of illustration, none of these are defined as the target word of interest, whereas "cat" is so defined. To rephrase, the SAS may analyze a word or phrase, such as "how are you today" and determine there are no likely instances, of the target word "cat."

Returning to FIG. 2, the first word instance 230 reflects detecting an utterance which could correspond to the target word, and which is over the confidence threshold 235. Hence, this instance is reported as a reported instance of the target word. Herein, a reported instance of a word is when the confidence score meets or exceeds the threshold value shown by line 235. A reported instance is depicted in FIG. 2 by a circle. Other embodiments may use other symbols or symbol characteristics. Hence, reported instances 230 and 234 are shown as circles as they are above the threshold. Similarly, detected word instances which were not reported, i.e., which were below the threshold 225 are shown as squares. Thus, instances 232 and 236 were not reported (excluded) and are unreported instances of the target word.

At the moment, it should be recognized that reported instances 230, 234 are not confirmed as being correct. Neither are unreported (excluded) instances 232-236 confirmed as correct. Thus, an "instance" merely represents an utterance that may or may not be reported. For example, if an instance has a confidence score that is significantly below the threshold level, then the occurrence of the utterance may be dismissed as a potential utterance of the target word, since it is so unlikely that it could be a potential reported instance. A measure of practicality is appropriate. For example, consider detecting the target word is "cat" in the utterance "how are you today." Each detected word could be theoretically a potential instance of the target word "cat", but since the confidence level of each word is likely so low relative to the target word, that each instance could be discarded. On the other hand, if the utterance was "How are you today, Kate", then the utterance of "Kate" may be relevant to the analysis as a potential instance. Without some practical understanding that an instance represents an utterance that is 'close' in some way to the target word, then each utterance, noise, or sound, would be considered an instance, and would simply serve to confuse the inventive concepts presented herein. The way to distinguish between instances that are "close" to the target word and those which are not, is illustrated below by introducing a concept called the "zone of uncertainty."

Figure 3:
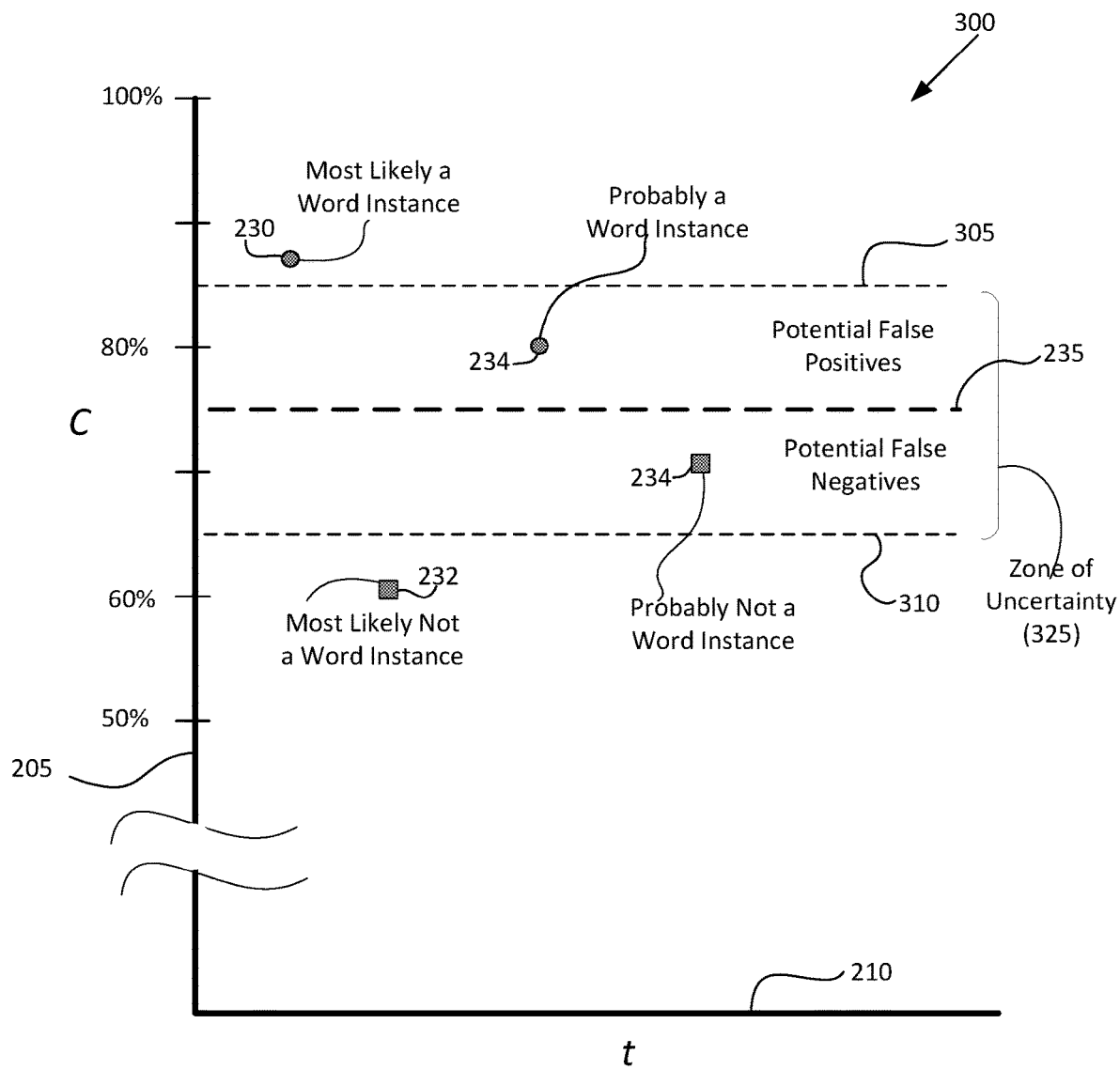

Turning now to FIG. 3, an expanded view of the scattergram is shown. In this view 300, the X axis is label with a "t" 21b0 representing time, and the Y axis represents the confidence score, denoted by a "C" 205. The same four instances 230, 232, 234, and 236 are shown with two instances above the threshold line 235 and two instances below. However, added are two lines 305, 310, which represent an upper limit of uncertainty 305 and a lower limit of uncertainty 310. The area between is referred to as the "zone of uncertainty" 325.

The value of the upper and lower limits of the zone of uncertainty 305 and 310 are configurable. In this embodiment, they are about 10% above and below the threshold level 235. Thus, the zone of uncertainty is 20%, evenly divided across the threshold of 75%. In other embodiments, the zone of uncertainty could be asymmetrical relative to the threshold value and other values could be used. The values show are merely illustrative. The exact values can be different.

The zone of uncertainty represents limits where the confidence score of a word instance may be called into question. Consider, for example, the first word instance 230 which is above the upper limit of 85% 305. Recall that instances that are above the threshold line are reported as an instance of the word, and hence the first instance 230 is shown as a circle. Because it is above the upper limit 305, there is a high level of confidence that this audio was correctly reported as an instance of the target word. Compare this to the instance 234 which is below the upper line limit 305. In this case, the resulting score was above the threshold, and as such, the audio was reported as an instance of the target word. However, it was just above the threshold limit, at approximately 80% as depicted in the figure. Thus, there is less certainty for this second instance 234 relative to the first instance 230 that the audio was correctly reported as a word instance. Similarly, instance 232 was not reported as a word instance and its score was below the lower limit, shown as 60%. This is most likely not an instance of the target word. However, the other instance 236 is closer to the threshold line. It is at approximately 70% as shown, which means it was probably not an instance of the target word, but the confidence is not as great relative to instance 232.

The various instances shown in FIG. 3 may correspond to various utterances of the words "cat", "Kate", "cot", "can't", or other words. For sake of clarity, words such as "how", "are", "you" are presumed to be so far below the zone of uncertainty that they are not shown in FIG. 3.

The processing of audio to determine whether an utterance is an instance of the target word is subject to various conditions that may result in an incorrect determination. The presence of accents, poorly pronounced words, background noise, poor voice connections, etc. can all contribute to mistakes being made by the SAS in matching utterances to target words. The confidence score of a corresponding utterance can be adversely impacted by these factors and based on the setting of the threshold level, the instances may be incorrectly reported or not reported as an instance. Thus, instances 234 and 236 are sufficiently close to the threshold line 235 that their outcome determinations may be suspect. In other words, they are close enough to the line that an error may have occurred in reporting or excluded them. For example, instance 234 (just above the line) may be a false positive, and instance 234 (just below the line) may be a false negative. On the other hand, other audio processing instances will produce a score, as shown by instance 230 or 232 that are outside the zone of uncertainty, such that there is a high level of confidence that the words were correctly processed—either by properly reporting them or by properly excluding them. Stated another way, those utterances processed with a score outside the zone of certainty have a greater likelihood of being correct, while those words processed with a score inside the zone of certainty have a relative greater likelihood that they may be incorrect. Of course, instances 230 and 232 which are outside the zone may also be incorrect, but it is accurate to say that the likelihood is little. Defining the limits of the zone of uncertainty effectively results in not expending further resources to manually check the outcomes. If it turns out that instances outside the zone of uncertainty are incorrectly classified, then the limits of the zone may be expanded (or vice versa).

The exact limits of the upper and lower limits of the zone of uncertainty may be defined based on trial or error, or set to a default value. In this illustration, they are at +/−10%. At some point, experience will indicate if other values should be used as a default or otherwise altered during the process. However, at some point based on the defined limits, a resulting score below the lower limit will be low enough that it is not worth verifying whether the word was properly excluded as a word instance. For example, a word with a confidence score of 30% is so low, that it can be presumed that it was properly excluded as a word instance. In fact, in the scattergram, there may be a number of utterances with a confidence score with respect to the target word in the 0-40% range that are so low that they are not even shown as potential instances.

On the other hand, a word with a confidence score of 74% is only slightly below the threshold 235 of 75%, and there is a higher likelihood of this being an error compared to the former example that is outside the zone of uncertainty. Similarly, a word may be reported as an instance of a target word with such high confidence, that there is little doubt that the reporting was correct. Similarly, a word with a 76% score is properly reported as an instance of the target word (given a threshold of 75%), but it, too, may be an error, since it only barely passed the threshold level.

Impacts of Altering the Acceptance Threshold

In various applications, it may be desirable to adjust the default acceptance threshold level 235. While 75% is shown as the acceptance threshold in FIG. 3, in other embodiments it may be discovered some other value is more appropriate or more accurate. Thus, the threshold 235 could be adjusted higher or lower depending on the circumstances.

If the acceptance threshold is increased, then this will have the effect of reducing the possibility of incorrectly reporting word instances, or reducing the number of false positives. If, for example, the threshold were set to 99%, then only instances with a 99%+ confidence score would be reported, and it would be virtually guaranteed that any such instances reported are correct. Rarely would a false positive occur. However, doing so has the strong possibility of wrongly excluding words. Stated another way, increasing the acceptance threshold will increase the possibility of a false negative; i.e., increase the possibility of a word being improperly excluded. Similarly, decreasing the acceptance threshold will increase the likelihood an uttered word will be reported as above the acceptance threshold, but it will have the consequence of increasing false positives; i.e., it will incorrectly sweep in and report utterances which are not correct. If the threshold level were, e.g., 1%, then many sounds would exceed this threshold level and be reported as instances of the target word, but would be incorrect.

Thus, a fundamental dilemma in setting the acceptance threshold is that for a given target word, there is a choice of increasing the threshold 235 to minimize false positives, or decreasing the threshold to minimize false negatives, but doing so in each case has the result of potentially increasing other errors. Further, it is possible to set the threshold 235 so as to cause the same number of false positives as false negatives.

User Validation of Preliminary Determinations

A speech analytics system may process a word and determine a corresponding confidence score of a potential instance of a target word. If the score is over the threshold, then a reported instance has been detected. If the score is not over the threshold, then the instances is not reported—e.g., it is excluded from being reported. It is also referred to as an exclusion instance. However, these terms ("reported instance" and "excluded instance") refer to unvalidated (a.k.a. as preliminary or unconfirmed) outcomes. The instances 230-234 shown in FIG. 3 are alleged determinations of instances in light of a defined confidence threshold. In FIG. 3, these instances were depicted as grayed-out circles for reported instances and grayed-out squares for excluded instances. The grayed-out indication represents that the instance is unconfirmed or preliminary. Thus, it is possible that the reported instance or the excluded instance was incorrect.

Each of these identified instances on a scattergram can be validated by a human, and the human's determination can be used as the basis for evaluating the correctness of the purported outcomes of the SAS (i.e., the accuracy). Validation involves the human listening to the recording of the corresponding audio of that instance and making a subjective determination of whether the audio is the target word. Once the instance has been validated, it will can be put in one of four different categories. If the analysis of the word is reported as an instance and this is correct as determined in validation, then the reporting of the instance can be referred to as a "confirmed reporting" or a "confirmed instance." (Other words may be used to indicate this concept.) If the analysis excludes the word as an instance of the target word, and this is confirmed in validation, the instance can be referred to as a "confirmed exclusion" or "confirmed unreported instance." If the analysis is incorrect, than an incorrected reported instance is called a "false positive" or a "false reported instance." Similarly, an incorrect exclusion is termed a "false negative" or a "false unreported instance." Use of these terms (e.g., confirmed exclusion, confirmed reporting, false negative, false positive) implies knowing the actual state of an instance, e.g., one that has been verified or validated by a human in some manner. Stated another way, the SAS makes a preliminary/purported/reported determination of an instance based on a given confidence score threshold level, which needs to be confirmed (validated) to be certain whether the preliminary determination is correct. Once the threshold level is found to be sufficiently accurate, then the reported determinations can be presumed to be accurate with a degree of confidence.

The validation of an instance is shown in subsequent figures as either a black or white fill. Thus, a grayed-out fill represents the preliminary state prior to validation and a solid color (black or white) is associated with an instance representing a validated instance. Specifically, a solid black circle or square represents a confirmed reporting or a confirmed exclusion respectively. A white circle or square represents a false positive or a false negative, respectively. These determinations are relative to the defined threshold level.

Figure 4A:
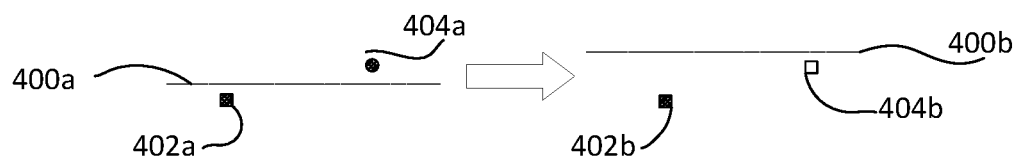

To illustrate this graphically, FIGS. 4A-4D are used. Turning to FIG. 4A, the confidence threshold 400*a* is shown at a given level. Two instances are shown 402*a* and 404*a*. The first instance 402*a* is below the line so it is excluded, and represented as a square. The other instance 404*a* is shown above the line, and hence is represented as a circle. In these instances (because they are shown in black and white), the status has been confirmed as correct, so the first instance 400*a* is a confirmed exclusion and the other instance 404*a* is a confirmed reporting instance.

FIGS. 4A-4D also show what happens if there is a change in the confidence score threshold value used to evaluate the confidence score with respect to these word instances. Returning back to FIG. 4A, threshold line 400*b* is illustrated as being raised, relative to line 400*a*. In both cases, instances 402*a* and 402*b* are correct determinations, i.e., they are correctly shown as exclusions for both threshold levels. If the acceptance threshold were increased, it would have the effect of improperly excluding instance 404*a* so that the result would be instance 404*b*. Confirmed exclusion 402*a* would remain correctly excluded as instance 402*b*. The result would be that instance 404*b* would become a false negative; hence it is shown as a white square. Increasing the threshold level reflects increasing the likelihood of errors of false negatives. Stated another way, an instance such as 402*a*, which is below the line, will continue to be below the line if the threshold line is increased. However, an instance such as 404*a* which is above the line, may change and become below the line if the line is increased.

Figure 4B:
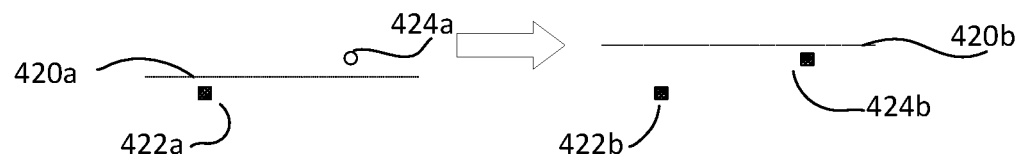

On the other hand, turning to FIG. 4B, with the initially set acceptance value of instance 420*a*, the result was that the second instance 424*a* was incorrectly reported an instance—it is a false positive. If the acceptance threshold were increased, then instance 424*b* would then result below the threshold as instance 424*b*, and then the instance would be correctly excluded; hence it is shown as a black square.

Figure 4C:
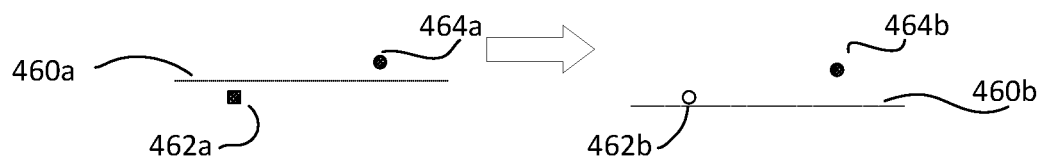
Figure 4D:
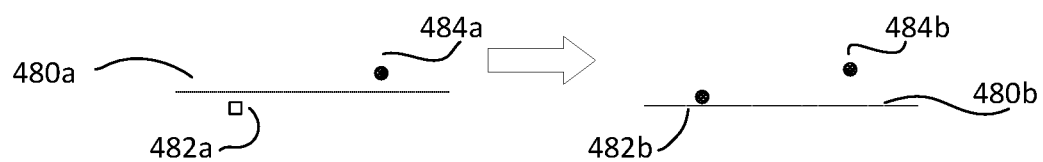

FIGS. 4C and 4D illustrates what happens if the acceptance threshold is lowered. Specifically, in FIG. 4C the threshold 460*a* is shown as being lowered 460*b*. In FIG. 4C, instance 464*a* will remain as a correctly reported instance when the threshold is lowered in instance 464*b*. However, instance 462*a*, which is correctly excluded, will become an incorrect reporting, or a false positive as instance 462*b* when the threshold is lowered.

On the other hand, in FIG. 4D, another possibility is illustrated of what may happen if the acceptance threshold is lowered. Specifically, in FIG. 4C the threshold 480*a* is shown as being lowered 480*b*. In FIG. 4D, 484*a* will alter from an incorrectly reported instance 482*a* when the threshold is lowered to a correctly reported instance 482*b*. In other words, instance 482*a* which is a false negative will become a correct reporting instance 482*b*. Instance 484*b*, which is correctly reported will remain a corrected reported instance 484*b*.

The purpose of FIGS. 4A-4B is to illustrate how changing the acceptance threshold can alter the results so as to change an incorrectly reported instance to a correctly reported instance. Further, based on how much, and in which direction, the confidence threshold is moved, it is possible that correct determination of instances may be transformed into incorrect determinations. The changing of the acceptance threshold by increasing or decreasing it will have different impacts for different instances. Changing the acceptance threshold may "weed out" incorrect determinations or it may further add incorrect determinations. Or, it may do both, to differing degrees.

Determining the optimal value for a threshold value can be complicated. One factor to consider is the set of instances for a target word. If there is only one instance, which is incorrectly reported, then moving the threshold may alter the instance to a correct instance. Thus, this would result in 100% accuracy and improvement. However, rarely is there only one instance which is involved. Typically, there are multiple instances of the word that have to be considered in a set of audio data. It should be remembered that altering the acceptance threshold to optimize results is predicated upon working with data of validated instances. If the instances have not been validated, altering the acceptance threshold will ultimately alter the number of reported or excluded instances, but it will not be known whether doing so is minimizing or increasing the actual errors.

Sample Sets

In order to determine how or whether to alter the acceptance threshold from a predetermined or current value, an optimization process must be performed on a sample set of instances, which may be found in a plurality of audio call recordings. While it is possible that a target word may be uttered several times during one call, using just one call may provide too limited of a sampling environment. The party may have a poor connection, the party may have an accent, or other factors may be present on that call which are atypical for purposes of determining a representative sample of the target word to use to confirm the optimal threshold value. Thus, it is frequently desirable to sample a number of calls in order to obtain a representative sample of target word usage.

The audio recordings can be obtained in a number of ways. In one embodiment, audio recordings could be purposefully made by contact center personnel for the purposes of optimizing the SAS system. An agent could be asked to record various instances of uttering the target word. This approach would be useful for obtaining a sample of agent provided utterances. Further, the agent could be asked to utter a series of target words, based on the assumption that optimization will occur for these plurality of target words. In other cases, the agent may be asked to read a pre-written script which has the various target words incorporated therein. In other embodiments, the contact center could select a number of stored call recordings, or collect a number of sample recordings from different agents, which would have the indicated target words. In other embodiments, the contact center could process a number of live calls as they occur.

The sampling may also focus on speech from the remote party as opposed to the agent. In this case, the utterances of the remote party for a series of calls can be obtained and analyzed. These calls could be sampled based on a region of the country, demographic information, or some other characteristic. A variety of mechanisms could be used to identify a scheme for selecting a set of calls in order to obtain a representative sample. Or, a set of call recordings could be selected which meet the desired criteria.

Once a sample set of audio recordings or calls are identified, they are processed with the SAS to identify instances where the target word is tentatively detected. As noted earlier, techniques maybe employed to discard utterances which are clearly not examples of the target word. Thus, for example, if the target word is "cat", then instances that could be examples of the target word, such as "kit", "can't", "pant" could conceivable be included as a potentially detected instance. Other words, such as "bridge", "automobile", etc. which have no similarity in sounding like "cat" would be dismissed as a potential instances. In short, the following discussion focuses on analyzing utterances that could be a viable instance of the target word, and dismisses those utterances which are clearly not a viable instance of the target word. As indicated earlier, by setting the zone of uncertainty and focusing only on instances within the zone of uncertainty, only those instances likely to be relevant are maintained and others are discarded.

When analyzing the audio (whether it be recordings or live calls, or both), the SAS will create and record meta-data regarding the corresponding potential instances identified. This meta-data may include information about the identified target word and a relative location in the audio recording where the utterance is located. The particular data structure used may vary, and include an audio file name where the instances was obtained, which identifies the call audio recording, and for each target word, a location identifier which is used to identify where in the audio that utterance is located. This could be defined, in one embodiment, as a time offset from the beginning of the audio. Other techniques are possible for noting the location. This location and subsequent locations of utterances associated with the target words would be recorded in a file of meta-data. In addition, a confidence score value associated with each instance may be recorded in the meta-data. If the analyzing also determines whether the instance is reported or excluded, that information may also be part of the meta-data.

Figure 5:
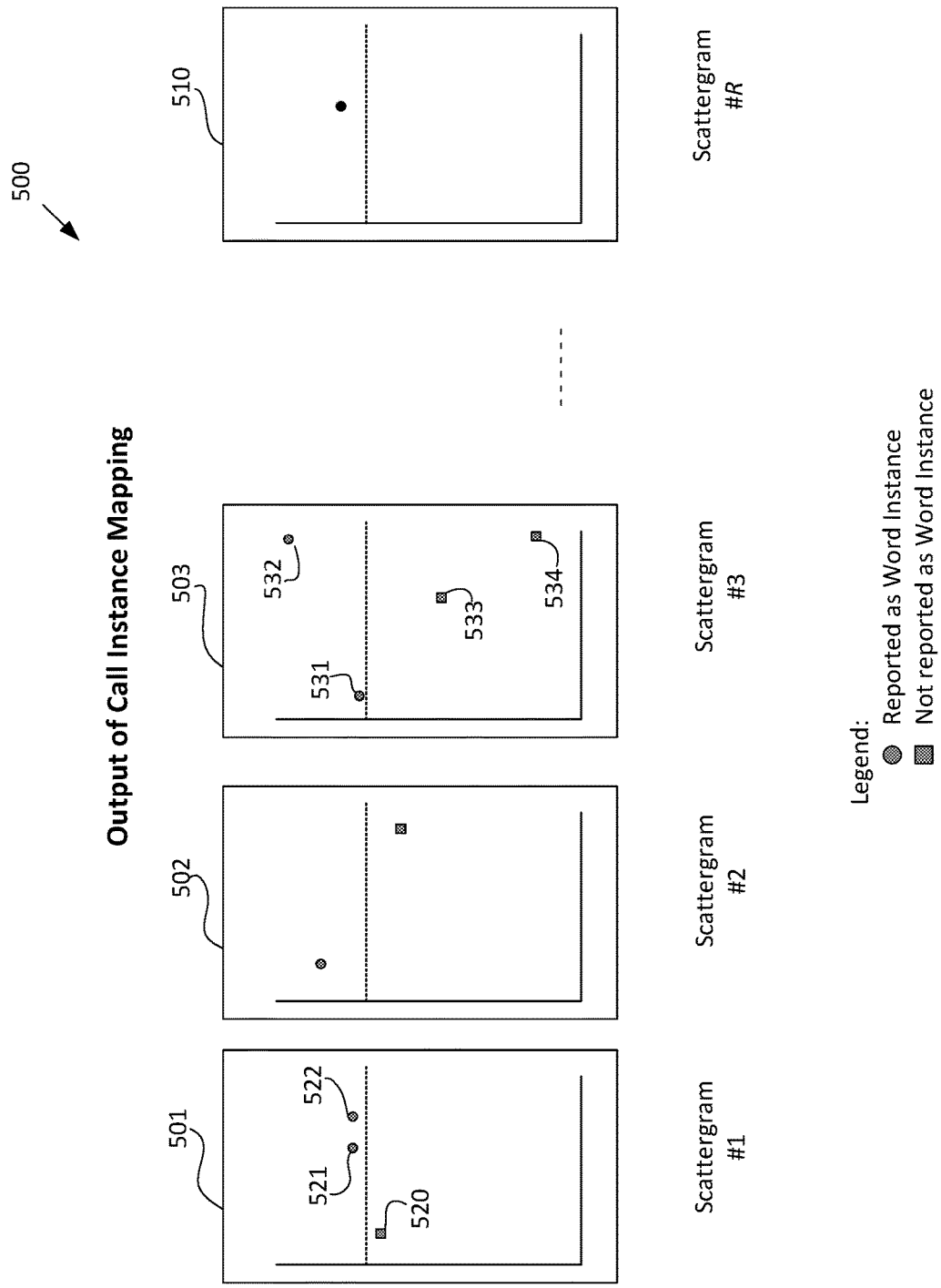

The above information could be used to generate the images depicted in FIG. 5, each of which are referred to as a "scattergram." A scattergram is the result or process of mapping call instances to create a graphical depiction of the relative scores for the identified instances. Thus, when coupled with additional logic for allowing varying the threshold level and recalculating the categorization of the instances, an interactive logical model can be provided to the user depicting the impact of categorizing the data using a defined threshold level. As used herein, the "call instance mapping" refers to the process of mapping meta-data and other logic/data used to construct the scattergram on a graphical user interface depicting the relationship of the instance data. The scattergram thus allows a person to view the relational dependencies in a convenient, easy to understand form. FIG. 5 depicts a sample set of call instance mappings represented as scattergrams 501, 502, 503, and 510.

Turning to FIG. 5, the mappings 500 are shown as a series of scattergrams 501, 502, 503, and 510. Each scattergram illustrates the result of a call instance mapping of the same target word. Because the instances are shown as "grayed-out" icons, as opposed to black/white icons, these scattergrams represent purported or preliminary findings as to whether the instances are reported or excluded. That is, the instances have not yet been confirmed.

The first scattergram 501 illustrates three instances 520, 521, and 522 of the target word. The first instance 520 is excluded (i.e., not reported as an instance) as it is below the acceptance threshold line. The next two instances 521 and 522 are illustrated as reported, as they are (barely) above the acceptance threshold. When viewing the scattergrams, it is evident that these instances are relatively close to the confidence score threshold value. In comparison, the third call instance mapping 503 also illustrates three instances, with the first instance 531 just above the acceptance threshold line. The other three instances 532, 533, and 534 are relatively far above or below the acceptance threshold line.

The scattergram is the visual depiction of a particular mapping of call instances for a particular threshold level. Thus, a scattergram is designed for human consumption that is created using the call instance mapping data and reflects a particular call instance mapping. The data used to create the scattergram is based on processing the meta-data, i.e., the call instance mapping data. That data itself is useful for computer processing, but the data by itself is difficult for a human to readily interpret as raw data. Thus, reference to a scattergram in a visual form will include the associated call instance mapping data as processed in the context of a particular threshold level value, but reference to the call instance mapping data, by itself, does not necessarily imply it is formatted in a visual manner nor for a particular threshold value.

FIG. 5 does not illustrate the zone of uncertainty, illustrated in prior figures as lines above and below the threshold level line. The limits of the zone of uncertainty could be represented as a horizontal upper and lower limit on each scattergram. Once the zone of uncertainty is defined, a process could be defined whereby only those instances within the zone of uncertainty are shown in the scattergram. In other words, the scattergrams could be processed so that the user is shown only those instances within the zone of uncertainty. In other embodiments, the limits of the zone of uncertainty could be shown with on the scattergram. This illustrates another distinction between the scattergram and the call instance mapping data, as a scattergram may cull out some of the call instance mapping data for purposes of simplifying the display to the user.

Figure 6:
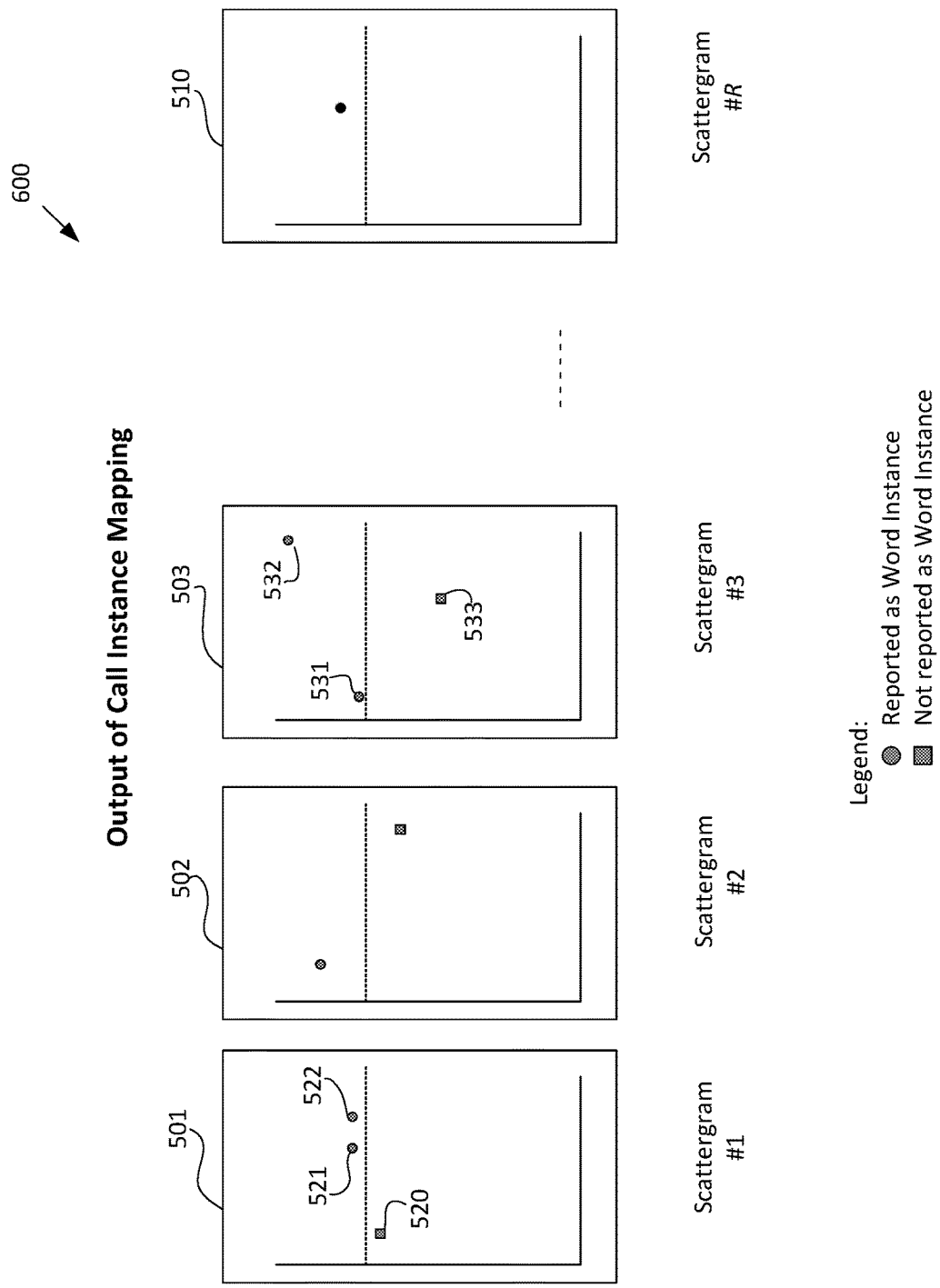

Once the zone of uncertainty is defined, which could be modeled as the upper and lower limits, then instances outside of the limits may be removed from display. For sake of illustration, consider instance 534 of scattergram #3 503. If the lower limit of the zone of uncertainty is located below instance 533 and above instance 534, then the instance 534 would be removed. If the lower limit of the zone of uncertainty were altered (e.g., lowered) to be below instance 534, then the third scattergram 503 may depict the instance 534. Once this is discarded, the resulting series of scattergrams could be depicted as shown in FIG. 6. Thus, in this representation, each shown instance represents an instance that may have been incorrectly determined, because each is within the zone of uncertainty. The user may now use an application to interact with the audio recordings to validate or confirm the outcome of each instance.

User Validation Process

The process of confirming the purported status of each instance on a scattergram is described via the perspective of user who interacts with a GUI displaying the scattergrams. The process involves the user selecting an instance, reviewing the audio of the instance, and confirming for each instance, whether the purported outcome is correct or not.

A user presented with the series of scattergrams of FIG. 6 could use a pointer or other such device to select an instance for validation. Depending on the size of the scattergram, a portion of a scattergram could be presented, the entire scattergram, or a plurality of scattergrams. For example, the user could select the first instance 520 in the first scattergram 501 and select a function on the screen (not shown) to review the audio of the call associated with this instance.

Selecting the instance for purposes of reviewing the audio would result in retrieving the meta-data associated with that instance indicating where the corresponding audio is located. That audio is retrieved and played to the user. The user could listen to the audio and ascertain whether the target word was actually spoken or not. If the word was not spoken, then the process was correct in excluding that instance 520. The user could confirm the reported outcome. If the word was spoken and detected by the user, then depicting the instance 520 as excluded in the scattergram 501 would be an error. The user could then indicate that instance as a false negative. This again could be accomplished using the pointer and selecting various screen functions. Likely, dedicated function keys on the GUI would allow the user to select whether the instance was correctly or incorrectly displayed.

Specifically, the user could also select instances where the word was reported (i.e., the instance is above the threshold line) and listen to the recordings and determine if the word was spoken, and hence correctly detected. If so, the user could report that instance as correctly determined as reported. If not, then the user could report that instance as incorrectly determined, i.e., a false positive.

The user could select each instance chronological order, or in some other order. It is not material that the instances are validated in a particular order. The user could verify all reported instances first, then all excluded instances, or examine each instance in a chronological order. After each instance is confirmed, its status will change to a confirmed representation. This is what is shown in FIG. 7.

Figure 7:
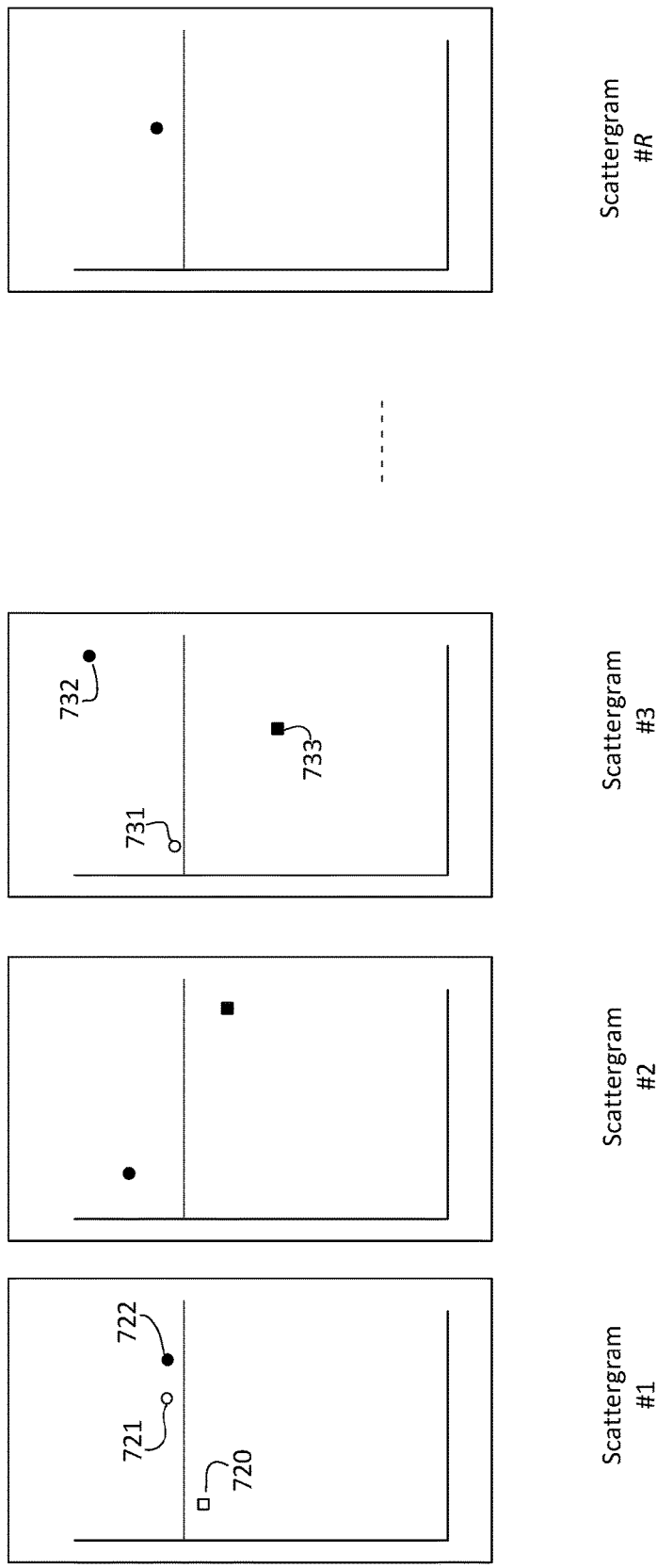

Turning to FIG. 7, the instances here are shown with black or white fill, representing that each instance has been verified (validated). If the process were partially completed, then those instances that were verified would be shown with black/white fill while the other remaining instances to be verified would be shown with a gray fill. Turning to the first instance of the first scattergram, instance 720, this represents a verified instance corresponding to instance 520 of FIG. 6. However, in FIG. 7, the instance is shown as "white" representing the verification demonstrated that original determination was incorrect—a false negative. This signifies that a spoken utterance of the target word was observed by the user. Moving to the next instance 721, it too, is shown in white. Because this is above the threshold line, it represents an incorrectly reported instance—a false positive. The third instance 722 is shown as a black fill, which represents a correct determination after the instance was verified. Thus, the target word was correctly reported in this case.

Skipping over to the third scattergram in FIG. 7, instance 731 is another example of a false positive, whereas both instances 733 and 732 were properly excluded and reported, respectively. Note that there is no fourth instance shown in the scattergram, as that value was outside the zone of uncertainty as discussed in FIG. 5, and was removed to produce the scattergram of FIG. 6.

When the process is completed by the user, the resulting scattergrams shown in FIG. 7 are the result. These may be displayed on the GUI together, one at a time, or a portion of a scattergram. All the instances are all shown with a solid fill as opposed to a grayed-out fill, representing that each instance has been validated. It is possible that a user may validate some of the instances, and may save the result, such that those instances not validated remain grayed out. In this way, the user can easily return in the future to complete the validation activity, knowing which instances have been validated and which ones have not. The corresponding meta-data for each instance may be updated to record information of whether the instance has been validated, the result, and date/time/user associated with the validation.

Once all the instances have been validated, the user could review the results. For example, looking at the series of scattergrams in FIG. 7, it is evident that the three incorrect outcomes (white fill) are shown, in instances 720, 721 and 731. One instance 720 is a false negative, and the other two incorrect instances 721 and 731 are false positives. Furthermore, these instance of errors are relatively close to the threshold line, as compared to, e.g., instance 732 and 733. It is not surprising that instances that are close to the threshold level may be incorrect, as those farther away from the threshold level are more likely to have been correctly determined.

Figure 8A:
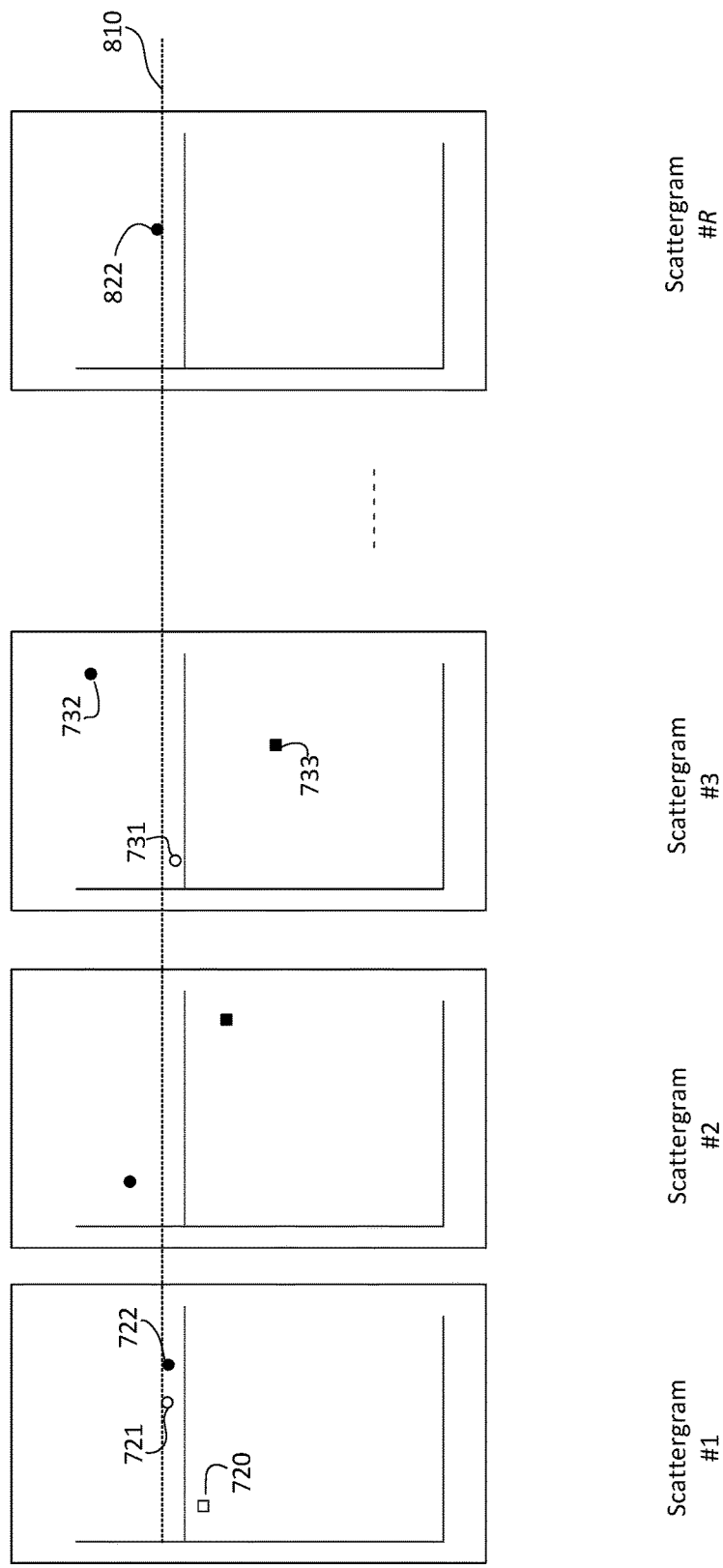

Next, the user may ascertain what would happen if the threshold level was different when the analysis took place. This can be simulated by allowing the user to shift the threshold level. This process is illustrated beginning with FIG. 8A. Turning to FIG. 8A, the modified threshold level 810 is shown spanning across all the scattergrams, in a slightly higher level than was originally used. The particular GUI-type tool for manipulating the threshold level is not shown, but this may be accomplished by using a selecting tool (e.g., a mouse) to select and move the line up or down. A corresponding numerical value of the threshold level could be displayed as the line is moved, which indicates a numerical value of that position.

If the threshold level is increased, then the instances that were below the original threshold level, such as instances 720 and 733 are not affected. However, examine and compare instances 721 and 722. They are both now below the threshold line 810. Originally, instance 721 was incorrectly reported as an instance of the target word while 722 was correctly reported as an instance. Under the new threshold level, both would unreported—i.e., they would be both excluded. However, under the new threshold level, instance 721 would now be correctly excluded. On the other hand, instance 722 which was correctly reported, would be incorrectly excluded.

Similarly, turning to instance 731, raising the threshold level would cause this instance, which was incorrectly reported, to be now be correctly excluded. This illustrates an important concept—changing the threshold level (whether up or down) may both correct errors and introduce errors. In the case shown in FIG. 8A, increasing the threshold level as shown results in correcting errors associated with instance 721 and 731, but introduces an error in instance 722.

Further, looking at instance 822, this was correctly reported as an instance. Even after moving up the threshold level, instance 822 is still above the level, and would continue to be reported as an instance, which would be correct. However, if the level were continue to be increased, then instance 822 would be transformed from a correct reporting to an erroneous exclusion. This diagram illustrates that altering the threshold level may correct some errors more than it cause errors. Conversely, altering the threshold level may cause more errors than it corrects.

Figure 8B:
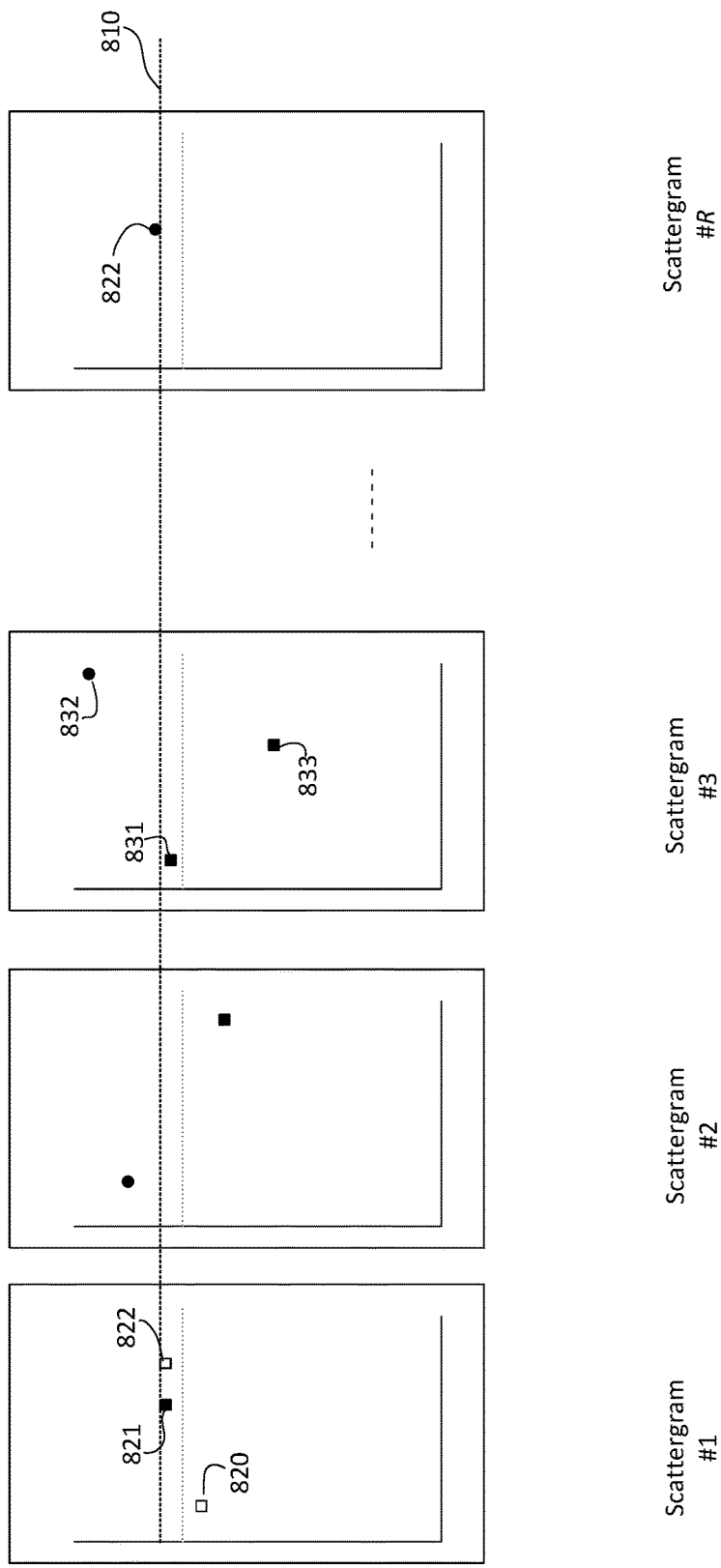

As noted above, as the line is moved, certain icons should be altered to reflect a new status. For example, as noted above, instance 721 of FIG. 8A was previously reported, but is now excluded. So, it should be shown as a square. Furthermore, it was incorrectly previously reported, but with the different threshold, so the instance should be shown as correctly excluded. Turning to FIG. 8B, the corresponding instance 821 is shown as a black square. Similarly, instance 822 is altered to show it as an incorrectly excluded instance, and instance 831 is shown as a correct exclusion. These icons can be automatically changed as the line is moved in real time, so that the user is present with correct status information.

Thus, the agent could be presented with controls to move the confidence threshold line up or down, causing each of the instances to be re-evaluated, so as to determine the optimal setting. In the example shown in FIG. 8B, there were several scattergrams shown. When the number of scattergrams displayed increases, the scale must become smaller, and eventually only a subset of the scattergrams may be displayed. Being able to visually review and determine when the line is at an optimal level is not easy when only a subset can be displayed. While it is possible for a user to heuristically adjust the line to minimize white icons (which represent incorrectly reported or excluded instances), it is not necessarily trivial, if the number of scattergrams is large. The user may have to scroll the scattergram to the left or right, to view all the possible scattergrams. In such embodiments, this may be necessary if the sample set of calls or recordings is large in number.

In such cases, displaying a large number of scattergrams to the user may be overwhelming. To aid the user, the system can calculate the number of instances involved for the set of scattergrams, including the number of instances which are correctly indicated (i.e., the number of icons comprising a circle or square having a black fill) and the number which are incorrectly indicated (i.e., the number of icons comprising a white fill). This can be further broken down into icons that are white circles, which represent false positives, and the number that are white squares, which are false negatives. This could be displayed to the user in the form of a scoreboard, of which one embodiment is shown in FIG. 9.

Figure 9:
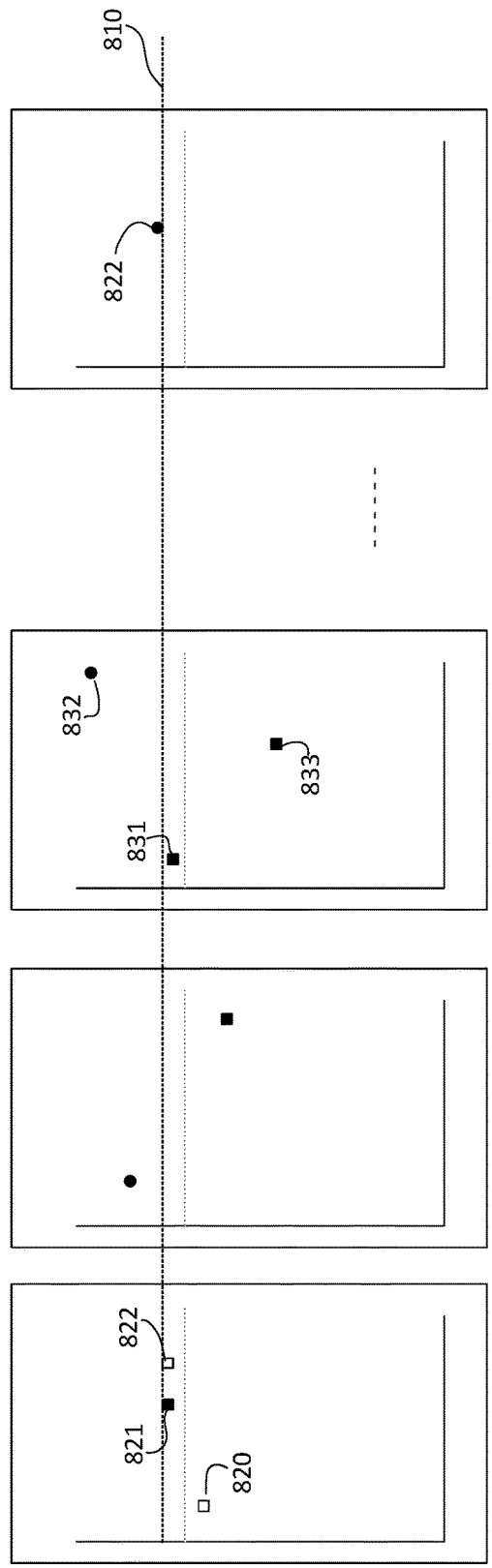
FIG. 9 illustrates one embodiment of scattergrams and a corresponding graphical user interface according to one embodiment.
Figure 9:
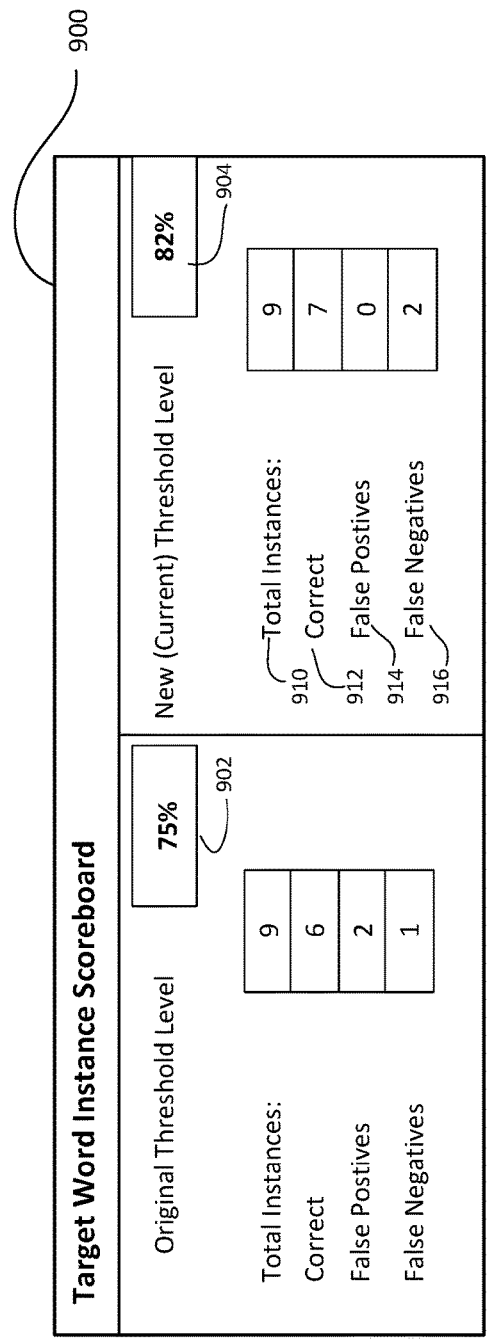

Turning to FIG. 9, a real-time determined scoreboard indicates the original threshold level 902 that was used when reporting the original status of the instances, and the new or current threshold level 904 used after the user adjusting the threshold level. Then, for each threshold level (i.e., the original value and the current value), a set of values representing the number of instances 910 is shown, the number of correct determinations 912, the number of false positives 914 and the number of false negatives 916. In this manner, the user can adjust the threshold and view the corresponding number of correct determinations 912. Other formats, such as tables can be used to indicate a number of threshold levels and their corresponding results. As long as the number of correct instances is higher for the current threshold level than the value of the original threshold level, the new threshold level or value represents an improvement. The user can manipulate the threshold value until the highest number of correct determinations are made. In this way, the user is provided feedback as to whether a new threshold level would improve or degrade the accuracy of operation.

In addition, the information could be presented in graphical form. It is well known to transform a table of data to a graphical form. In this case, the X-axis would represent the various threshold values used, and the Y axis would represent the number of correct indications for each instance. Further, this could be broken down in the number of correct reported instances and the number of correct excluded instances. This would allow the user to readily comprehend an optimal value based on a peak of correct instances of some form.

Impacts of Changing the Threshold Level

As mentioned earlier, increasing the threshold level will have the effect of increasing the likelihood of excluding an instance. If, for example, the threshold level were set to 99.9%, then virtually all, but a few, instances of detecting a target word will be excluded. Thus, a higher threshold has the results of ensuring that any results reported are correct, which has the result of reducing false positives. But, a higher threshold will likely exclude some correct instances that should have been reported, e.g., increasing false negatives.

Stated another way and using FIG. 5 as an example, if there are 9 instances reported in the set of scattergrams, then increasing the threshold to 99.9% would have the effect of reporting zero instances. However, the number of false positives, however, would diminish to zero. Conversely, lowering the threshold has the opposite effect. Lowering the threshold would report more instances, and exclude fewer instances. In the example of FIG. 5, lowering the threshold would result in reporting all nine instances as examples, but there would be a higher number of false positives. If lowered enough, every instance would be reported, but there would be an increase in false positives, and eventually no false negatives would be reported.

It is evident that there are some constraints that limit the maximum number of errors. Assuming that the number of instances analyzed=X, then the maximum number of incorrect exclusions can never be greater than X. Similarly, the maximum number of false positives cannot be greater than X. Further, the total number of false positives and false negatives combined cannot exceed X.

Determining an optimal threshold level is somewhat subjective. One approach is to select a threshold value that minimizes the total number of false positives and false negatives. Another approach may involve attributing greater importance to minimizing false positives, or attributing greater importance to minimizing false negatives. This could be accomplished by defining a limit where the number of e.g., false positives is no more than e.g., 20% of the number of false negatives. A number of different criteria could be used to define an optimized threshold level. For purposes of illustration, and not for limitation, the criteria used to explain the concepts herein is based on minimizing the number of errors (total of false positives and false negatives) which is equivalent to maximizing the number of correct detections.

Process Flows

A recap of the overall process is now described. Starting with FIG. 10, preliminary inputs to a system are needed prior to processing the audio and deriving the meta-data of each instance. In some cases, default values may be used. For example, default threshold levels could define the zone of uncertainty and the acceptance threshold level, or these could be edited to reflect a custom value. Further, a target word must be indicated. Thus, in this example, the process begins in step 1005 with the user defining a target word. This word or phrase represents a target utterance that is to be processed in the audio source, for purposes of fine-tuning the confidence threshold level to improve word detection.

The target word may be defined by the user typing the letters of the word, which is mapped to phonemes to be searched or the target word can be defined phonetically. Once the target word is identified, then the audio to be processed is then identified in step 1010. This step may identify audio recordings, criteria for selecting call recordings, or identifying real-time calls to be handled that meet a desired criteria. For example, one criteria may be to process the audio of 1000 calls associated with a certain campaign by sampling every $10^{th}$ call over a period of several days.

Next, the audio is processed by the SAS in operation 1015 to identify instances of the target word. Those utterances within the zone of uncertainty are identified as a tentative or preliminary instance, and the associated meta-data is created. Each instance of the associated meta-data is recorded in step 1020, and a test is made whether there is further audio to be processed in step 1025. If there is no more audio to process, then the process is complete. Otherwise, the process loops back to step 1015 to continue processing.

As a result of this process, the audio source has been processed to search for one or more target words to identify where the target word may appear in that audio. In some embodiments, this processing involves defining meta-data for every word in the audio, whereas in other embodiments, the evaluation of the word may be limited by culling instances outside the zone of uncertainty.

This process may occur automatically at regular intervals, or may be specifically initiated by a contact center administrator. For example, a periodic review of the accuracy of certain target words may be executed for existing campaigns, or a specific review of the accuracy of a specific target word may be executed for a newly developed campaign. In some cases, this process may execute as a background process. For example, the process may execute nightly using daily call recording over a period of weeks.

Figure 10:
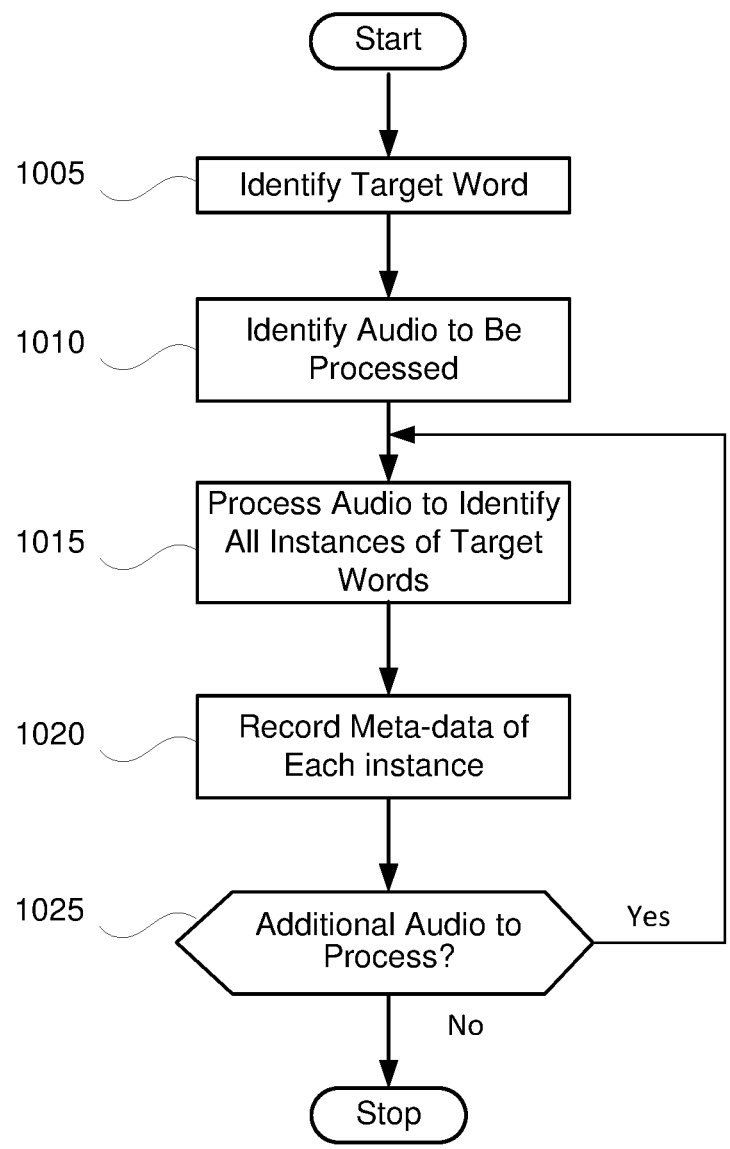
FIG. 10 illustrates one embodiment of a process flow according to the concepts and technologies disclosed herein for processing audio to identify instances of a target word.
Figure 11:
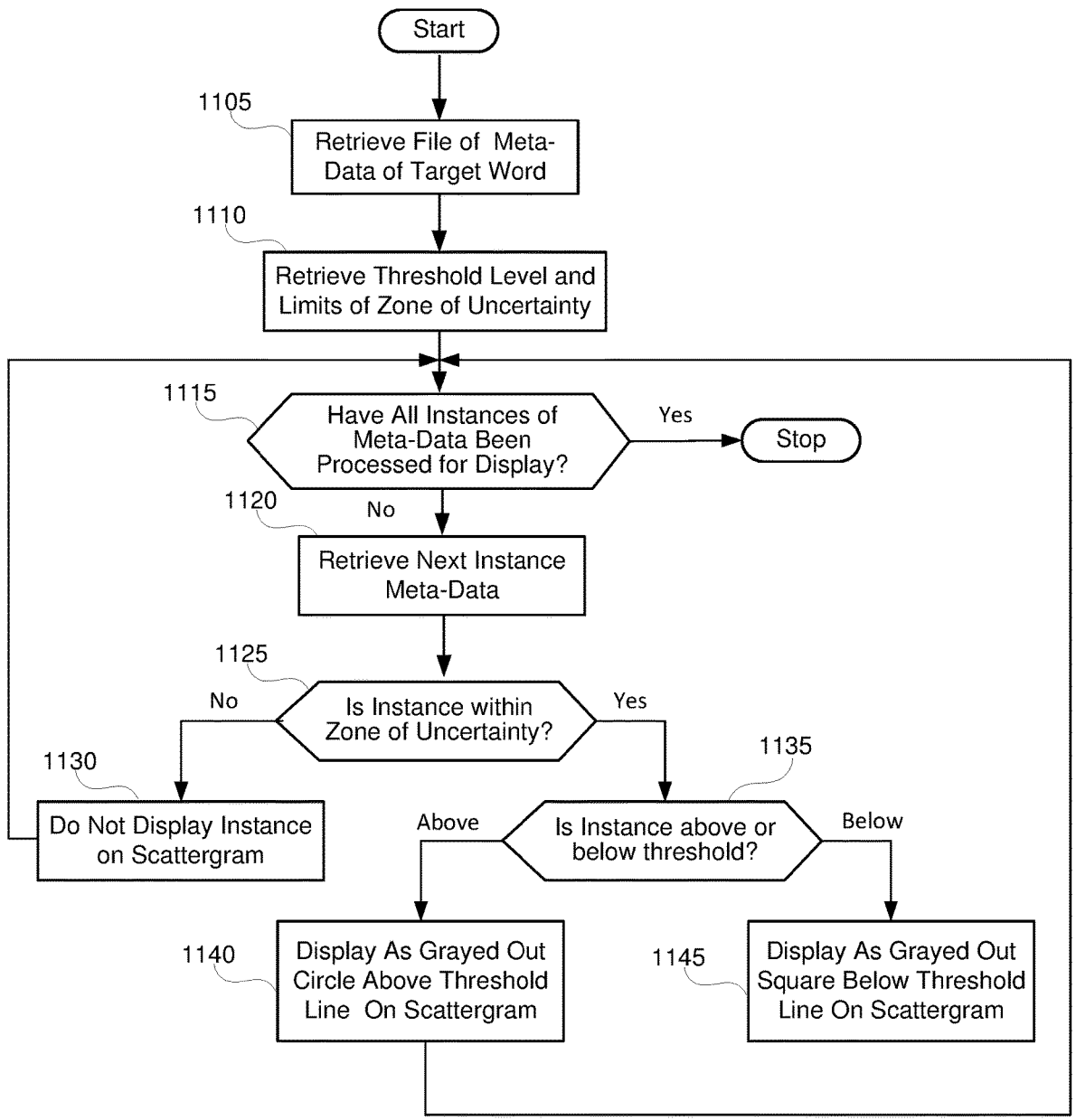
FIG. 11 illustrates one embodiment of a process flow for processing instances to determine a categorization of each instance relative to threshold value associated with the zone of uncertainty.

The process shown in FIG. 11 may occur simultaneously with the above mentioned process of FIG. 10, or may occur separately. This process flow processes the meta-data in order to prepare scattergrams. Recall that the meta-data itself is not easily digested by humans, and processing it into scattergrams allows humans to more readily comprehend the data. The process begins by retrieving the metadata in operation 1105 and the threshold level, along with the limits of the zone of uncertainty in operation 1110.

Assuming that the not all instances have been processed, the decision shown in operation 1115 continues to operation 1120, where the meta-data of the next applicable instance is retrieved. Next, a determination is made whether the instance is within the zone of uncertainty in operation 1125. If not, then in operation 1130 the instance is not displayed on the scattergram and the process loops back to operation 1115 to process the next instance. If the instance is within the zone of uncertainty in operation 1125, then a determination is made whether the confidence score for that instance is above or below the threshold level in operation 1135. If above the threshold level, then that instance is tentatively determined an instance of the target word and is indication as reported, and is to be displayed as a gray filled circle above the threshold level in operation 1140. At this stage, it is a tentative determination, and hence the circle is grayed-out (or otherwise indicated in some similar manner where the visual characteristic indicates the instance has not been confirmed. The process then loops back to the next tentative instance of meta-data to process.

If the instance is below the threshold at operation 1135, then it means the instance is excluded as a tentatively detected instance of the target word. That results in displaying the instance as a grayed-out square, below the threshold level. Although the process of FIG. 11 is described as separate from FIG. 10, the processes can be integrated.

Figure 12:
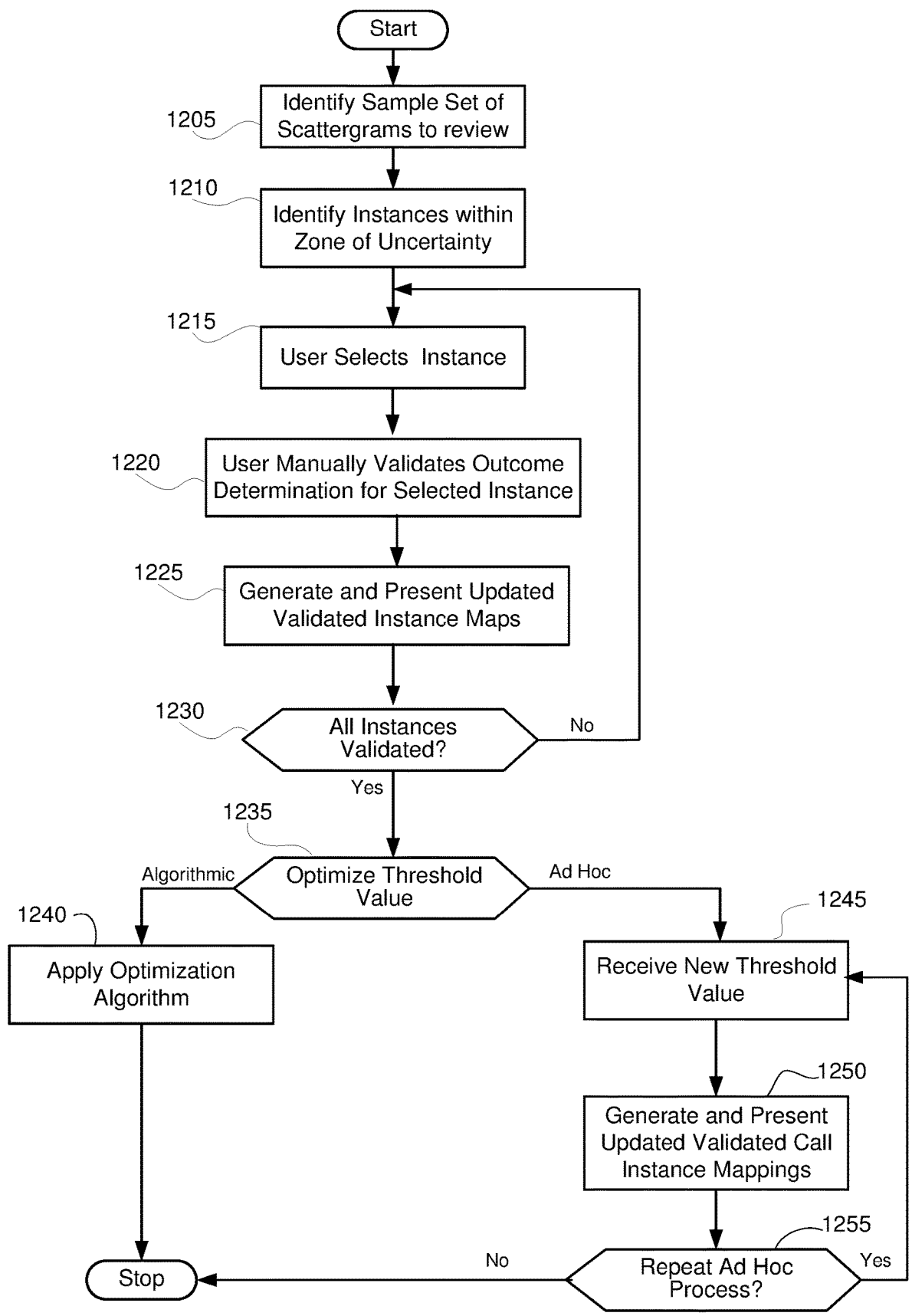
FIG. 12 illustrates one embodiment of process flow for validating the outcome determinations of these instances by a user.

Next, the user validates the tentative results. This process is shown in FIG. 12. The process begins with the user identifying the set of scattergrams to review in operation 1205. The user may redefine the threshold level and/or the levels associated with the zone of uncertainty in operation 1210. If the zone of uncertainty is changed, then the process may have to review the instances if they were processed previously with respect to the zone of uncertainty. That is, instances inside or outside the zone of certainty previously may have changed when using a new value.

Next, the user selects in operation 1215 a particular instance, using a GUI. The user requests that the audio in the audio source for that instance be played. The user may interact with an audio player, allowing the audio of the corresponding instance to be played, replayed, paused, and resumed. This allows the user to potentially listen to the audio, and surrounding context, multiple times to ascertain whether the target word was spoken or not. The user than confirms or validates that the instance is correctly reported or excluded in operation 1220. Once that is indicated, the system may update the display to properly display that instance in operation 1225. Specifically, the instance will be depicted as a solid color fill to reflect it was validated and whether it was correctly or incorrectly determined.

Figure 13:
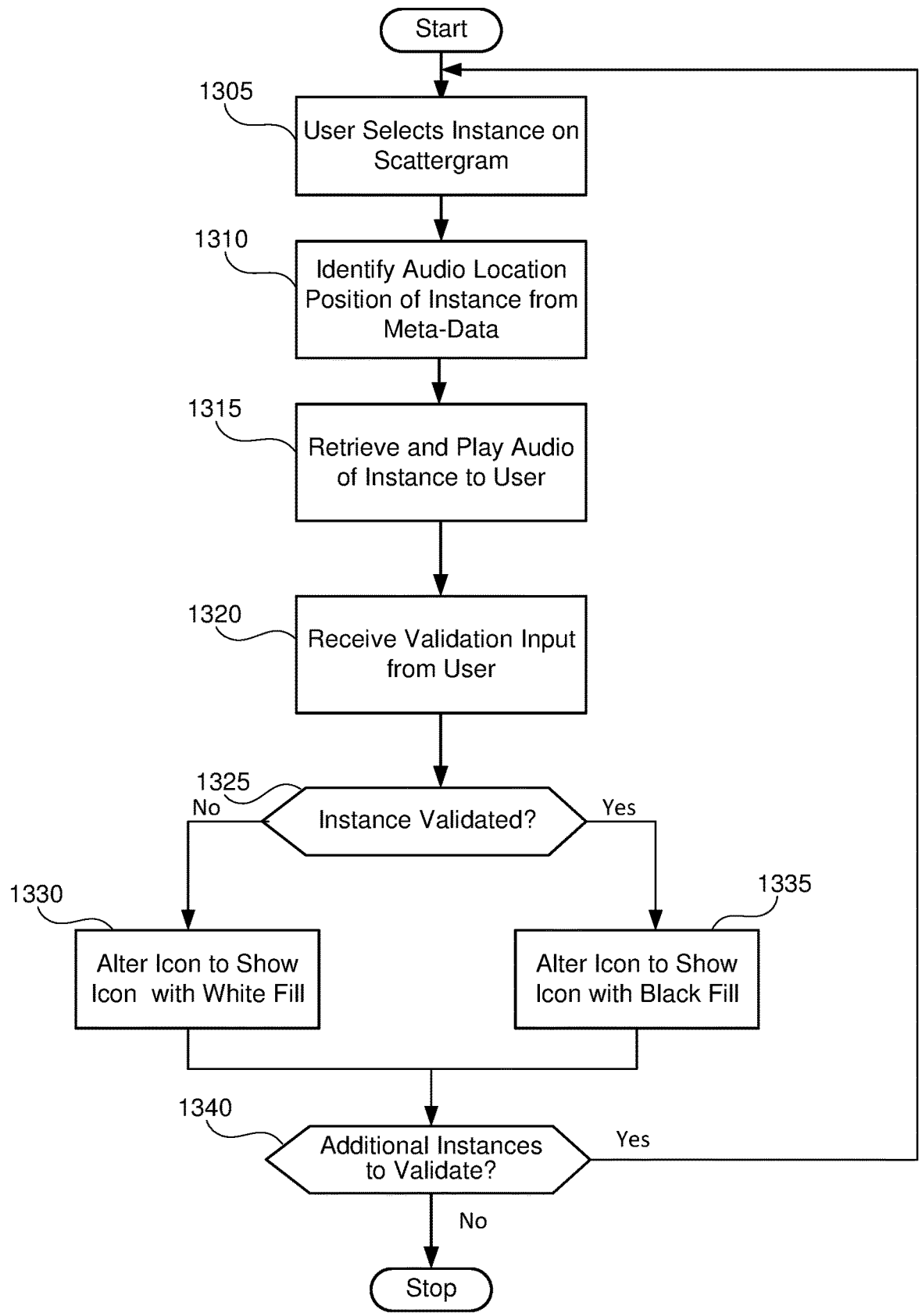
FIG. 13 illustrates one embodiment of a process flow for developing a graphical user interface comprising a scattergram depicting user validated instances.

The validation process is shown in greater detail in FIG. 13. Turning briefly to FIG. 13, the process involves the user selecting an instance on the scattergram in operation 1305. Typically, this is done using a pointing device, but various mechanisms can be employed using a GUI. Next, the audio location of that instance is determined by the SAS in operation 1310, which is determined from the previously determined meta-data associated with that instance. Next, the audio of the instance is retrieved and played to the user in operation 1315. The user may replay this several times, if necessary. Then, the user provides input in operation 1320 regarding whether the instance was correctly determined. If the instance is correctly indicated in operation 1325, then the icon is filled in with black fill in operation 1335. If the instance is incorrectly indicated, then the icon is filled with white fill in operation 1330. A test is made in operation 1340 as to whether additional instances need to be validated.

Returning back to FIG. 12, a test in operation 1230 determines whether the user continues validating remaining instances. If there are other unvalidated instances remaining to be validated, the process loops back to allow the user to select another instance to validate. The user may suspend the process at this point, and resume validating instances at a later time. The indication of instances as either grayed-out or solid fill allows the user to readily determine which instances are validated or remain to be validated.

Once the instances are validated, the user may then optimize the threshold level by continuing to operation 1235. This can be done in several ways. For purposes of illustration, two approaches are shown: algorithmic and ad-hoc. The ad-hoc approach can be based on the user visually reviewing the scattergrams and adjusting the threshold level in operation 1245, and the SAS then recalculating the impact to the instances in operation 1250. As indicated in FIG. 9, a summary of the change in the various outputs can be provided to the user when the threshold level is changed. The user may desire to alter the threshold level, essentially repeating the ad hoc process in operation 1255. The user may alter the threshold level a number of times before determining that the results are optimal. Once the process is completed in operation 1255, the process stops.

The ad hoc approach can be time consuming. Returning back to the example shown in FIG. 9, the threshold level was shown as originally 75% and a new level of 82%. However, to ensure whether this is optimal, the user may have to run the analysis at each increment, e.g., once at 65%, 66%, all the way to 90%. This process can be automated, and that is the automated branch shown at operation 1235, which applies an optimization algorithm in operation 1240.

Figure 14:
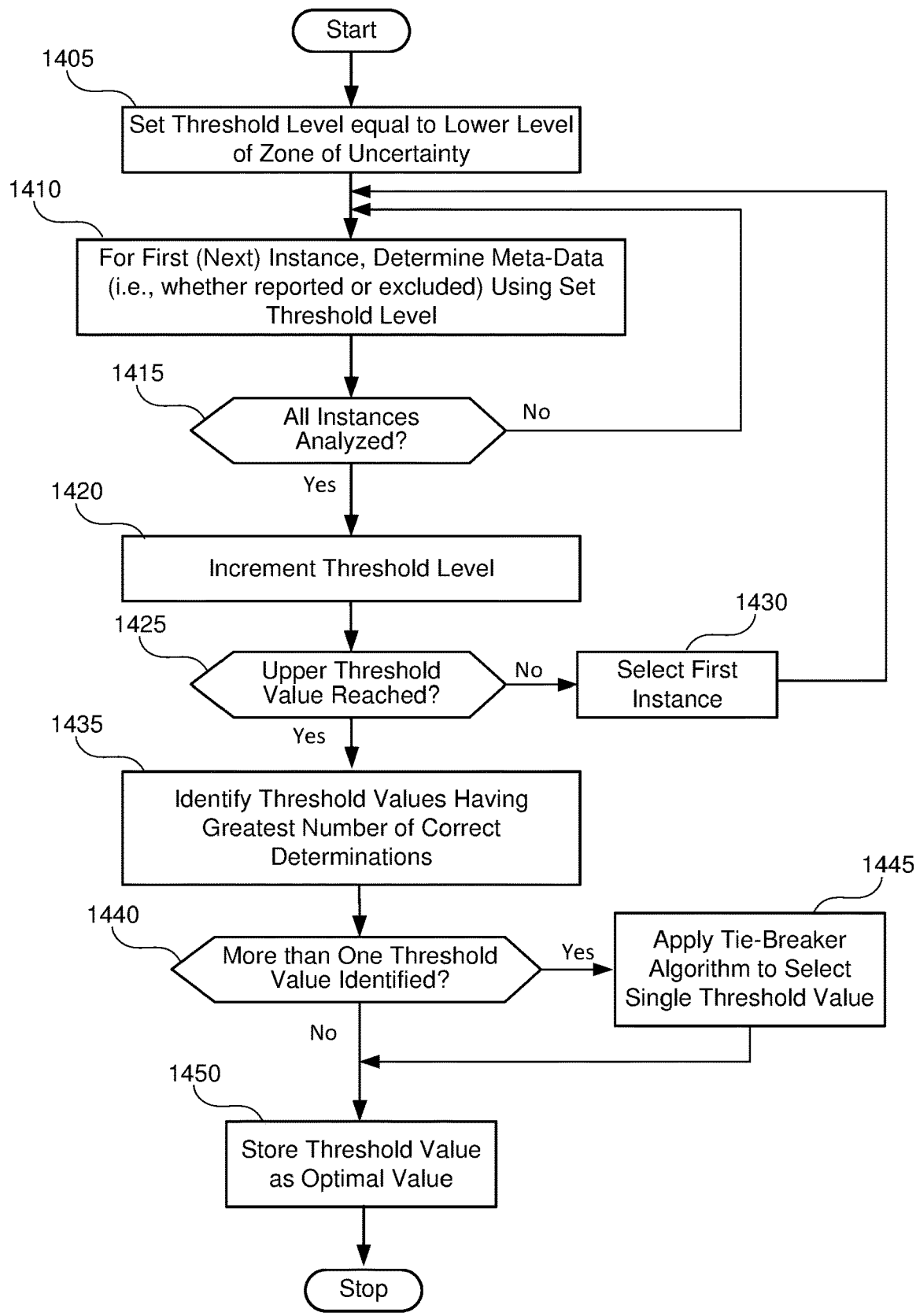
FIG. 14 illustrates one embodiment of a process flow for optimizing the confidence score threshold level.

The algorithmic based approach can be illustrated by turning to FIG. 14. The process begins by setting the threshold value to an initial value (such as the lower value of the zone of uncertainty) in operation 1405. Then, the first instance (or next instance as appropriate) is analyzed to determine the appropriate meta-data when using that threshold value in operation 1410. This includes determining whether that instance would have been reported or excluded based on that threshold value. Further, based on the validation information, a determination is made whether that outcome would have been correct or incorrect. Thus, the meta-data may include information reflecting that the instance would have been e.g., correctly excluded, incorrectly excluded, correctly reported, or incorrectly reported.

A test is made to see if this is the last instance in the audio to be analyzed in operation 1415, and if not, then the process loops back to operation 1410 and analyzes the next instance using the same threshold value. Once all the instances are analyzed in operation 1415, the process continues to operation 1420 where the threshold value is incremented, and the process is repeated by selecting the first instance in operation 1430 and repeating the analysis 1410-1425 for each instance using the new threshold value. This process is repeated for all threshold values. Typically, the upper limit of the threshold value would be equal to the upper limit of the zone of uncertainty.

Once all instances are analyzed using all threshold values, the test in operation 1425 will proceed to operation 1435, where the cumulative set of meta-data from all the various threshold values is reviewed to identify which threshold value produced the greatest number of correct determinations for the instances. Specifically, if the maximal score result is determine by having the greatest number of correct instances, that threshold value is selected.

If there is more than one threshold value having the maximum number of correct determinations, then a tie-breaker algorithm is applied in operation 1445. This algorithm may be based on selecting the threshold value that produced a lower number of false positives or false negatives. Even so, there still could be multiple threshold values having the same number of correct determinations and the correct number of false positives or false negatives. Another tie-breaker could be applied, where the lowest or highest threshold value could be selected. This would result in essentially favoring a threshold value that results in the largest number of correct determinations for instances, but favors avoiding false positives or false negatives. Once the tie-breaker is applied, then a single optimal threshold value is stored in operation 1450, and the process is complete.

It is possible to apply other algorithms. For example, if a plurality of threshold values are determined to have a maximum number of correct determinations, the lowest or highest threshold value could be selected, thus avoiding examining the number of false positives or false negatives. Selecting the lowest threshold value will favor avoiding false negatives (i.e., including more false positives), whereas selecting the highest threshold value will favor avoiding false positives (i.e., including more false negatives).

Defining Threshold Levels for a Target Word Comprising a Phrase

Another technique that can be applied to increase detection of a target word applies if the target word is actually a phrase (e.g., target words). For example, the phrase "Southco Account Number" may be a phrase that is desired to be detected. The phrase "Southco" may be a name of a company, whereas "account" and "number" are common English words. In a first approach, the entire phrase "Southco Account Number" may be entered as a target. However, assume that the phrase "Southco" may not be readily recognized for some reason, but "account" and "number" are readily recognized. The above process could be applied to determine an optimum threshold value for maximizing correct determinations. Thus, the process would determine an optimal threshold value for "Southco" and separate (potentially default) threshold values for "account" and "number."

Alternatively, the threshold value could be optimized using the above process just for the target word "Southco" which would produce an optimal threshold value for just that target word, separate from that of "account number." Further, it may be possible to separately optimize the threshold value for "account number". Thus, the application of two specific threshold values for two separate target words, when combined, may produce a more accurate result than using the single phrase "Southco account number."

Another approach is to define the phrase to be detected as two target word(s), in close proximity of each other. For example, the phrase to be detected could be "Southco" immediately followed by "account number." Then, the logic for reporting the phrase could be to report either:
1. a reported instance of "Southco" followed by a reported instance of "account number", or
2. an unreported (excluded) instance of "Southco" followed by a reported instance of "account number."

In this case, a target word within the zone of uncertainty for "Southco" (whether reported or excluded) coupled with a reported instance of "account number" would satisfy the detection of the target phrase.

This may provide more flexibility in allowing utterances of the phrase to be detected, as opposed to optimizing the threshold value for the entire phrase "Southco account number." Consequently, a particular target word (or phrase) may have an associated optimized threshold level value, and that target word may be used with another target word which has its own optimized threshold level value.

Exemplary Processing Device Architecture

Figure 15:
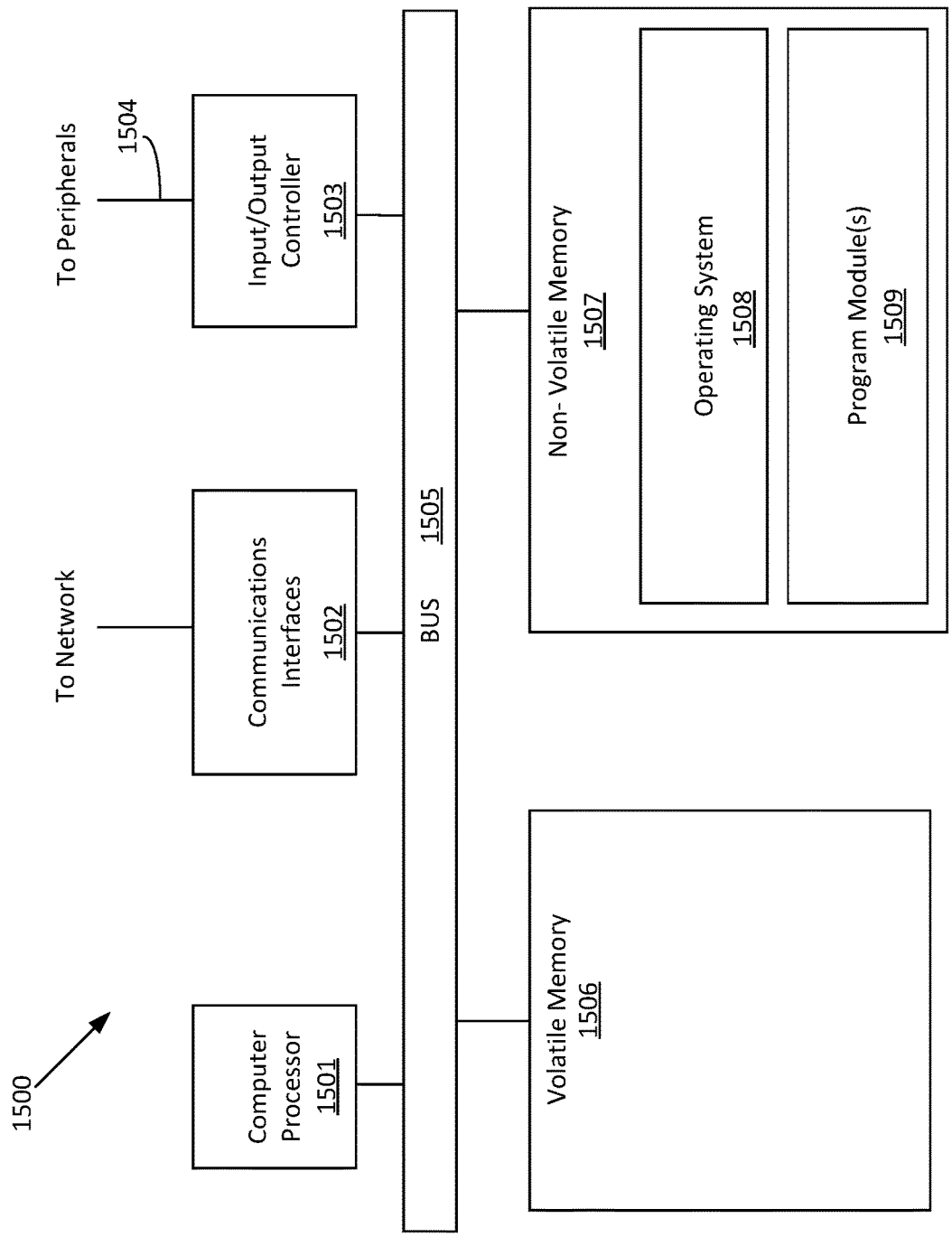
FIG. 15 illustrates an embodiment of a computer based processing device for practicing various technologies and concepts disclosed herein.

FIG. 15 is an exemplary schematic diagram of a processing component 1500 that may be used in various embodiments of VoIP switches and or analytics processing systems that could practice the technologies disclosed herein. This includes, such as, a wireline switch (functioning as e.g., a Class 5 end office), a wireless switch (i.e., a mobile telephone switched office or MSTO), etc. In general, the term "computer processing component" may be exemplified by, for example, but without limitation: various types of computers, servers, blades, gateways, switches, and the like, as well as any combination of devices or entities adapted to perform the functions described herein.

As shown in FIG. 15, the computer processing component 1500 may include one or more computer processors 1501 that may communicate with other elements within the processing component 1500 via a bus 1505. The computer processor 1501 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 1500 may also include one or more communication interfaces 1502 for communicating data via the local network with various external devices. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay. A variety of signaling protocols may be used, such as those associated with SIP.

The computer processing component 1500 may further include an input/output controller 1503 that may communicate with one or more input devices or peripherals using an interface 1504, such as, but not limited to: a keyboard, a mouse, a touch screen/display input, microphone, pointing device, etc. The input/output controller 1503 may also communicate with output devices or peripherals, such as displays, printers, speakers, headsets, banner displays, etc.

The computer processor 1501 may be configured to execute instructions stored in volatile memory 1506, non-volatile memory 1507, or other forms of computer-readable storage media accessible to the processor 1501. The volatile memory 1506 may comprise various types of memory technologies, including, but not limited to: random access memory ("RAM"), dynamic random access memory ("DRAM"), static random access memory ("SRAM"), and other forms well known to those skilled in the art. The non-volatile memory 1507 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1507 may store program code and data, which also may be loaded into the volatile memory 1506 at execution time. Specifically, the non-volatile memory 1507 may store one or more program or application modules 1509 to perform the above described processes and/or functions associated with the technologies disclosed herein, and/or operating system code 1508. In addition, these program modules 1509 may also access, generate, or store data 1510, in the non-volatile memory 1507, as well as in the volatile memory 1506. The volatile memory 1506 and/or non-volatile memory 1507 may be used to store other information including, but not limited to: records, applications, programs, scripts, source code, object code, byte code, compiled code, interpreted code, machine code, executable instructions, or the like. These may be executed or processed by, for example, the computer processor 1501 and/or may form a part of, or may interact with, the program modules 1509.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation. Unless a claim recite the word "means" in conjunction with a function, no claim limitation is intended to be interpreted in a "mean-plus-function" form.

The invention claimed is:

1. A non-transitory computer readable medium storing instructions that when executed cause one or more computer processors to:
   a) receive a target word to be identified in an audio source;
   b) process the audio source to determine a plurality of corresponding confidence scores associated with a plurality of instances of the target word in the audio source;
   c) compare the corresponding confidence score of each of the plurality of instances to an initial confidence score threshold value to determine a corresponding first preliminary status indicating whether each of the plurality of instances of the target word is reported or excluded; and
   d) indicate a corresponding first status icon to a user via a graphical user interface ("GUI") for each of the plurality of instances of the target word, the corresponding first status icon indicating whether the corresponding instance of the target word is reported or excluded based on the corresponding first preliminary status.

2. The non-transitory computer readable medium of claim 1, wherein the instructions further cause the one or more computer processors to:
   receive from the user via the GUI a corresponding validation status input for each corresponding instance of the target word indicating whether the corresponding first preliminary status is correctly or incorrectly determined;
   compare the corresponding confidence score for each of the plurality of instances to a second confidence score threshold level value to determine a corresponding second preliminary status indicating whether the each of the plurality of instances of the target word is reported or excluded; and
   indicate to the user via the GUI the corresponding second preliminary status for each of the plurality of instances using a corresponding second status icon indicating the corresponding instance is either reported or excluded based on the corresponding second preliminary status.

3. The non-transitory computer readable medium of claim 2, wherein the instructions further cause the one or more computer processors to:
   cause the corresponding second preliminary status icon to indicate whether the corresponding instance is correctly reported, incorrectly reported, correctly excluded, or incorrectly excluded.

4. The non-transitory computer readable medium of claim 3, wherein the instructions further cause the one or more computer processors to:
   cause the corresponding second preliminary status icon indicating a correctly reported or incorrectly reported instance to be shown above a horizontal line; and
   cause the corresponding secondary preliminary status icon indicating a correctly excluded or incorrectly excluded instance to be shown below the horizontal line.

5. The non-transitory computer readable medium of claim 2, wherein the instructions further cause the one or more computer processors to:
   indicate using the corresponding second status icon the corresponding instance is either:
      reported, by displaying the corresponding instance above a horizontal line representing the initial confidence score threshold value, or
      excluded, by displaying the corresponding instance below the horizontal line.

6. The non-transitory computer readable medium of claim 5, wherein the instructions further cause the one or more computer processors to:
   indicate using the corresponding second status icon whether the corresponding instance is correctly reported or incorrectly reported based on a visual characteristic of the second status icon comprising at least one of color, shape, line type, fill, or size.

7. The non-transitory computer readable medium of claim 1, wherein the instructions further cause the one or more computer processors to:
   indicate to the user via the GUI a first number of correctly reported first status icons associated with the initial confidence score threshold value and a second number of correctly reported second status icons associated with the second confidence score threshold value.

8. The non-transitory computer readable medium of claim 1, wherein the instructions further cause the one or more computer processors to:
   cause a corresponding portion of the audio source comprising the corresponding instance of the target word to be played to the user prior to receiving from the user a corresponding validation status input for each corresponding instance of the target word indicating whether the corresponding preliminary status is correctly determined.

9. The non-transitory computer readable medium of claim 1, wherein the instructions further cause the one or more computer processors to:
   determine the plurality of corresponding confidence scores associated with the plurality of instances of the target word are above a lower confidence threshold score value.

10. A method for selecting a confidence threshold value in a speech analytics system ("SAS") in a contact center, the method comprising:
   a) identifying a target word to be identified by the SAS in an audio source;
   b) providing an initial confidence score threshold level value used by the SAS to evaluate a plurality of confidence scores associated with a corresponding plurality of instances of the target word comprising speech in the audio source;
   c) ascertaining the corresponding plurality of instances of the target word in the audio source;

d) determining a corresponding confidence score for each of the corresponding plurality of instances of the target word;
e) comparing the corresponding confidence score for each of the corresponding plurality of instances with the initial confidence score threshold level value to determine a corresponding preliminary status indicating whether the each of the corresponding plurality of instances is reported as the target word; and
f) indicating to a user on a graphical user interface ("GUI") the corresponding preliminary status for each of the plurality of instances using a corresponding first status icon, each corresponding first status icon indicating the corresponding instance is either reported or excluded.

11. The method of claim 10, further comprising:
receiving from the user via the GUI a corresponding validation status input for each corresponding instance indicating whether the corresponding preliminary status is correct or incorrect;
comparing the corresponding confidence score for each of the plurality of instances to a second confidence score threshold level value to determine a corresponding second preliminary status indicating whether the each of the plurality of instances of the target word is reported or excluded;
indicating to the user via the GUI the corresponding second preliminary status for each of the plurality of instances using a corresponding second status icon indicating the corresponding instance is either correctly reported or correctly excluded; and
indicating to the user via the GUI a first number of the plurality of instances correctly reported and a second number of the plurality of instances correctly excluded.

12. The method of claim 10, further comprising:
playing a corresponding portion of the audio to the user comprising one of the corresponding plurality of instances;
receiving a corresponding validating input from the user, indicating either a correct or incorrect determination of the corresponding preliminary status for the one of the corresponding plurality of instances; and
after receiving the corresponding validating input from the user, after receiving the corresponding validating input from the user, recording corresponding meta-data of the corresponding one of the plurality of instances, wherein the corresponding meta-data comprises a validated status outcome indicating one from the group of correctly excluded, incorrectly excluded, correctly reported, and incorrectly reported.

13. The method of claim 10, further comprising:
comparing the corresponding confidence score for each of the corresponding plurality of instances with a second confidence score threshold level value to determine a corresponding second status indicating whether each of the corresponding plurality of instances is reported or excluded; and
indicating to the user via the GUI the corresponding second status for each of the plurality of instances using a corresponding second status icon indicating whether the corresponding instance is either correctly reported or correctly excluded.

14. The method of claim 13, further comprising:
determining a first number of the plurality of instances correctly reported using the initial confidence score threshold level;
determining a second number of the plurality of instances correctly reported using the second confidence score threshold level; and
indicating the second confidence score threshold level to the user via the GUI based on the second number being greater than the first number.

15. The method of claim 10, further comprising:
determining whether the initial confidence score threshold level value or a second confidence score threshold value is to be used for subsequent processing of audio comprising the target words.

16. A speech analytics system comprising one or more computer processors configured to:
retrieve an initial confidence score threshold level value used to evaluate a plurality of confidence scores associated with a corresponding plurality of instances of a target word in an audio source;
identify the corresponding plurality of instances of the target word in the audio source;
determine a corresponding confidence score for each of the corresponding plurality of instances of the target word;
compare the corresponding confidence score for each of the corresponding plurality of instances with the initial confidence score threshold level value to determine a corresponding preliminary status indicating whether the each of the corresponding plurality of instances is reported or excluded;
indicate to a user via a graphical user interface ("GUI") the corresponding preliminary status for each of the plurality of instances using a corresponding first status icon, wherein each corresponding first status icon indicates the corresponding instance is one of correctly reported, incorrectly reported, correctly excluded, or incorrectly excluded;
compare the corresponding confidence score for each of the corresponding plurality of instances with a second confidence score threshold level value to determine a corresponding second status indicating whether the each of the corresponding plurality of instances is one of correctly reported, incorrectly reported, correctly excluded, or incorrectly excluded;
determine a first number of the corresponding plurality of instances correctly reported using the initial confidence score threshold level;
determine a second number of the corresponding plurality of instances correctly reported using the second confidence score threshold level;
determine a greater value of the first number and the second number; and
display the greater value of the first number and the second number and a corresponding confidence score threshold value associated with the greater value to the user via the GUI.

17. The speech analytics system comprising the one or more computer processors of claim 16, wherein the one or more computers processor are further configured to:
play a corresponding portion of the audio to the user comprising one of the corresponding plurality of instances;
receive a corresponding validating input from the user after playing the corresponding portion of the audio, the corresponding validating input indicating either a correct or incorrect determination of the corresponding preliminary status for the one of the corresponding plurality of instances; and record corresponding meta-data for the corresponding one of the plurality of instances comprising a validated status outcome reflecting one from the group of correctly excluded, incorrectly excluded, correctly reported, and incorrectly reported, wherein the corresponding meta-data is recorded after receiving the corresponding validating input from the user.

18. The speech analytics system comprising the one or more computer processors of claim 16, wherein the one or more computers processor are further configured to:
alter the appearance of the corresponding first status icon on the GUI in response to receiving the corresponding validating input from the user.

19. The speech analytics system comprising the one or more computer processors of claim 16, wherein the one or more computers processor are further configured to:
display a scattergram to the user via the GUI, the scattergram comprising a horizontal line representing the initial confidence score threshold level value, a plurality of corresponding first status icons indicating the corresponding instance is one of correctly reported, incorrectly reported, correctly excluded, or incorrectly excluded, wherein the correctly reported and incorrectly reported instances are depicted above the horizontal line.

20. The speech analytics system comprising the one or more computer processors of claim 16, wherein the one or more computers processor are further configured to:
display a second scattergram to the user via the GUI, the second scattergram comprising a horizontal line representing the second confidence score threshold level value, a plurality of corresponding second status icons indicating the corresponding instance is one of correctly reported, incorrectly reported, correctly excluded, or incorrectly excluded, wherein at least a subset of the plurality of corresponding second status icons associated with correctly reported instances and incorrectly reported instances are depicted above the horizontal line.

* * * * *